(12) United States Patent
Sunaga et al.

(10) Patent No.: US 8,325,792 B2
(45) Date of Patent: Dec. 4, 2012

(54) APPARATUS AND METHOD FOR DECISION FEEDBACK EQUALIZATION

(75) Inventors: Kazuhisa Sunaga, Minato-ku (JP); Kenzo Tan, Kawasaki (JP)

(73) Assignees: NEC Corporation, Tokyo (JP); Renesas Electronics Corporation, Kanagawa (JP)

( * ) Notice: Subject to any disclaimer, the term of this patent is extended or adjusted under 35 U.S.C. 154(b) by 849 days.

(21) Appl. No.: 12/404,714

(22) Filed: Mar. 16, 2009

(65) Prior Publication Data

US 2009/0232196 A1 Sep. 17, 2009

(30) Foreign Application Priority Data

Mar. 14, 2008 (JP) ................................. 2008-066222

(51) Int. Cl.
*H03K 7/00* (2006.01)
(52) U.S. Cl. ........................................ 375/233; 375/229
(58) Field of Classification Search .................... 375/233
See application file for complete search history.

(56) References Cited

U.S. PATENT DOCUMENTS

| | | | |
|---|---|---|---|
| 7,668,238 B1* | 2/2010 | Rokhsaz | 375/233 |
| 7,805,083 B2* | 9/2010 | Gu et al. | 398/164 |
| 7,809,088 B2* | 10/2010 | Zerbe et al. | 375/320 |
| 7,924,912 B1* | 4/2011 | Rokhsaz et al. | 375/233 |
| 7,944,963 B2* | 5/2011 | Cases et al. | 375/226 |
| 2005/0041979 A1* | 2/2005 | Gu et al. | 398/155 |
| 2005/0069021 A1* | 3/2005 | Lakkis | 375/130 |
| 2006/0008279 A1* | 1/2006 | Chiang et al. | 398/202 |
| 2006/0109940 A1* | 5/2006 | Beukema et al. | 375/350 |
| 2006/0170453 A1* | 8/2006 | Zerbe et al. | 326/37 |
| 2008/0187036 A1* | 8/2008 | Park et al. | 375/233 |
| 2009/0010320 A1* | 1/2009 | Hollis | 375/232 |
| 2009/0060021 A1* | 3/2009 | Bulzacchelli | 375/233 |
| 2009/0168931 A1* | 7/2009 | Cases et al. | 375/348 |

(Continued)

FOREIGN PATENT DOCUMENTS

WO 2007037312 A1 4/2007

OTHER PUBLICATIONS

Koon-Lun, et al., Modified LMS Adaption Algorithm for a Discrete-Time Edge Equalizer of Serial I/O, IEEE Asian Solid State Circuits Conference, 2006. ASSCC 2006., the United States, IEEE, Nov. 13, 2006, pp. 387-390.

(Continued)

*Primary Examiner* — David Ometz
*Assistant Examiner* — Santiago Garcia
(74) *Attorney, Agent, or Firm* — Sughrue Mion, PLLC

(57) ABSTRACT

Disclosed is an apparatus including an odd data receiving unit that receives an input signal, an even data receiving unit that also receives the input signal, and a pattern filter. The odd data receiving unit samples a half-rate DFE equalized signal with an odd data timing clock to output data decision data. The even data receiving unit samples the half-rate DFE equalized signal with an even data timing clock having the phase shifted by 180 degrees from the odd data timing clock to output data decision data. The pattern filter selects one of the edge decision data sampled at the odd edge timing and at the even edge timing in response to the value of a data pattern of three consecutive bits obtained from the data decision data sampled at the odd and even data timings.

11 Claims, 17 Drawing Sheets

U.S. PATENT DOCUMENTS

| | | | | |
|---|---|---|---|---|
| 2009/0252215 A1* | 10/2009 | Bulzacchelli et al. | ........ | 375/233 |
| 2010/0054324 A1* | 3/2010 | Bulzacchelli et al. | ........ | 375/233 |
| 2010/0128828 A1* | 5/2010 | Mobin et al. | .................. | 375/348 |
| 2011/0096825 A1* | 4/2011 | Hollis | ........................... | 375/233 |
| 2011/0142120 A1* | 6/2011 | Liu et al. | ....................... | 375/233 |
| 2011/0249774 A1* | 10/2011 | Thakkar et al. | ............... | 375/316 |

OTHER PUBLICATIONS

Kouichi Yamaguch, et al., 12Gb/s duobinary signaling with ×2 oversampled edge equalization, IEEE International Solid-State Circuits Conference, 2005. Digest of Technical Papers., the United States, IEEE, Feb. 10, 2005, vol. 1, pp. 70-71.

Kouichi Yamaguch, et al., 12Gb/s duobinary signaling with oversampled edge equalization, IEICE Technical report, Japan, The Institute of Electronics Information and Communication Engineers, May 20, 2005, ICD, Integrated Circuits 105(96), pp. 13-18.

M. meghelli, et al., A 10Gb/s 5-Tap-DFE/4-Tap-FFE Transceiver in 90nm CMOS, IEEE International Solid-State Circuits Conference, 2006. ISSCC 2006. Digest of Technical Papers, the United States, IEEE, Feb. 6, 2006, pp. 213-222 (note) Part or all of non-patent documents presented may not be sent due to the limitations of law or contract etc.

Japanese Office Action issued Sep. 20, 2011 in corresponding Japanese Application No. 2008-066222.

John F. Bulzacchelli, et al., "A 10Gb/s 5-Tap DFE/ 4-Tap FFE Transceiver in 90-nm CMOS Technology", IEEE Journal of Solid-State Circuits, Dec. 2006, pp. 2885-2900, vol. 41, No. 12.

* cited by examiner

APPARATUS AND METHOD FOR DECISION FEEDBACK EQUALIZATION

REFERENCE TO RELATED APPLICATION

This application is based upon and claims the benefit of the priority of Japanese patent application No. 2008-066222 filed on Mar. 14, 2008, the disclosure of which is incorporated herein in its entirety by reference thereto.

FIELD OF THE INVENTION

This invention relates to a method and apparatus for decision feedback equalization and, more particularly, to edge timing detection following the decision feedback equalization.

BACKGROUND

In high-speed serial communication, it is well-known that an eye pattern is closed at a data receiving end of a receiver due to inter-symbol interference, referred to below as ISI, due to, for example, the frequency dependency of the loss on a transmission line, thus deteriorating a bit error rate.

There has been known a waveform equalization technique, termed decision feedback equalization (DFE), which compensates waveform deterioration due to ISI on the receiving circuit side.

The DFE is a waveform equalization technique that negatively feeds back an amount of succeeding ISI(Inter-Symbol Interference), corresponding to the result of decision of a received signal by a data decision circuit, to succeeding bits to remove ISI. As regards the DFE, reference is had to, for example, the disclosure of the Non-Patent Document 1.

In the present patent application, the DFE in which the period of the feedback signal is the data rate period (T) is termed the 'full-rate DFE', and the DFE in which the period of the feedback signal is twice the data rate period (2T) is referred to as 'half-rate DFE'.

In high-speed serial communication, such a scheme in which full-rate data is transmitted/received using a rise edge timing of a differential clock having a period (2T) equal to twice the data rate period (T), known as 'half-rate clock', is mainly adopted. This system is known as 'double-data rate system'.

In the double-data rate system, the data rate communication of 10 Gb/s, for example, is implemented using a differential clock of 5 GHz.

As an example, description is now made of the 1-tap DFE equalization operation of the double-data rate system with reference to FIGS. 1 and 2.

To a received signal 110 are added an odd DFE decision feedback signal 116 and an even DFE decision feedback signal 126, respectively, in an odd DFE adder 111 and an even DFE adder 121, which output DFE-equalized added signals 112 and 122, respectively.

These DFE-equalized added signals 122 and 122 are interleave-sampled by an odd data sampling unit 113 and an even data sampling unit 123, respectively, at a timing of an odd half-rate clock 118 and at a timing of an even half-rate clock 128, respectively.

Odd sampling data 114 from the odd data sampling unit 113 and even sampling data 124 from the even data sampling unit 123 are multiplied by tap gains 117 and 127, respectively.

An output of the tap gain 127, which is the odd DFE decision feedback signal 116, is negatively fed back to the odd DFE adder 111 as a signal to be added. An output of the tap gain 117, which is the even DFE decision feedback signal 126, is negatively fed back to the even DFE adder 121 as a signal to be added.

This DFE equalization by negative feedback removes ISI to enable correct data reception.

The DFE operation of the 1-tap double-data rate configuration will now be described using data d1, d2 and d3 of FIG. 2.

In the following, the data rate period is assumed to be T, with the half-rate clock period being 2T (in 10 Gbps communication, the data rate period T=100 ps and the half rate clock period 2T=200 ps).

To the received data d2 influenced by ISI, is added a decision feedback signal, corresponding to an odd sampling data d1 multiplied by a tap gain ($\alpha$), to generate a DFE-equalized even added signal:

$$d2 + \alpha \times d1$$

This DFE-equalized waveform is correctly sampled at an even half-rate clock to yield an even sampling data d2 with a period of 2T.

This DFE equalized waveform is correctly sampled at an even half-rate clock to generate even sampling data d2 with the period of 2T.

To remove ISI on an odd sampling data d3 by the sampling data d2, the odd DFE decision feedback signal 116 (=$\alpha \times d2$), corresponding to d2 multiplied by the tap gain ($\alpha$), is fed back to the odd DFE adder 111. The odd DFE decision feedback signal 116 is added in this odd DFE adder 111 to the received signal d3 so that the signal d3 is DFE-equalized.

This negative feedback process is repeated to realize DFE equalization of the double data rate system.

It should be noted that, since the double-data rate system samples data at a half-rate clock, the sampling data is of the period 2T equal to twice the data rate period T.

As a result, one of two signals to be added in the DFE adder is a received signal of the sampling data period of 2T, while the other is a received signal of the data rate period T.

The data waveform-equalized by DFE of FIG. 1 is only data at an odd or even sampling timing. Hence, the signals output from the DFE adders may be waveform equalized only at a rate of one per two data at each of the even and odd sides. As a result, there is produced a waveform which is an alternate repetition of waveform-equalized open eye data and non-waveform-equalized closed eye data, as shown in FIG. 4.

[Non-Patent Document 1]

Meghelli, Mounir; Rylov, Sergey; Bulzacchelli, John; Rhee, Woogeun, Rylyakov, Alexander; Ainspan, Herscel; Parker, Benjamin; Beakes, Michael; Chung, Aichin; Beukema, Troy; Pepeljugoski, Petar; Shan, Lei; Kwark, Young; Gowda, Sudhir; Friedman, Daniel, "A 10 Gb/s 5-Tap DFE/4-Tap FFE Transceiver in 90-nm CMOS Technology", IEEE International Solid-State Circuits Conference, February 2006

SUMMARY

The entire disclosure of Non-Patent Document 1 is incorporated herein by reference thereto. The following analyses are given by the present invention.

In serial communication, a clock signal is ordinarily not transmitted. Instead, a clock recovery circuit, abbreviated to 'CDR', which is configured to reproduce a clock signal from received data, is provided in a receiving side.

In general, a double over-sampling CDR, in which a signal at a data center timing phase and a signal at an edge timing phase are detected and compared each other to adjust the phase of the reproduced clock, is now in wide spread use.

FIG. 3 shows examples of full-rate DFE equalized eye pattern and edge distributions. From these edge distributions, the low-pass filtering function proper to the CDR extracts a distribution center to adjust a rising edge of a data sampling clock to a center position between the neighboring edges extracted to enable correct data sampling.

However, with the half-rate DFE, an eye opening may not be obtained on bits of before and after sides of an opening data sampled and edges are distributed over an entire time interval of the bit. As a result, there is elicited a problem that the center position between the edge positions cannot be correctly extracted and that a rising edge of the clock cannot be adjusted to a correct sampling phase position.

Accordingly, it is an object of the present invention to provide a method and apparatus for phase adjustment of the reproduced clock in case of using the half-rate decision feedback equalization (half-rate DFE).

It is another object of the present invention to provide a method and apparatus which may accomplish the above object and which may allow suppression of distributions of the reproduced clock to improve data sampling accuracy as well as to improve the communication quality.

The invention may be summarized substantially as follows:

In accordance with one aspect of the present invention, there is provided a decision feedback equalization apparatus comprising an odd data receiving unit that receives an odd data sampling clock, an odd edge sampling clock and a DFE input signal and that includes a half-rate DFE equalization function, and an even data receiving unit that receives an even data sampling clock, an even edge sampling clock and the DFE input signal and that includes a half-rate DFE equalization function. The odd data receiving unit includes a data detection means and an edge detection means on a half-rate DFE equalized signal. The even data receiving unit include a data detection means and an edge detection means on a half-rate DFE equalized signal. The decision feedback equalization apparatus also comprises a pattern filter that receives a set of sampling data by the detection means and that detects a data pattern, three consecutive bits of which are 110 or 001. The pattern filter selects edge data based on a result of the detection so that edge data on the half-rate DFE equalized signal will be selected only on detection of the data pattern of 110 or 001. According to the present invention, clock recovery is executed on the basis of the output of the decision feedback equalizer.

In accordance with another aspect of the present invention, there is provided a decision feedback equalization apparatus comprising an odd data receiving unit that receives an odd data sampling clock, an odd edge sampling clock and a DFE input signal and that includes a half-rate DFE equalization function, and an even data receiving unit that receives an even data sampling clock, an even edge sampling clock and the DFE input signal and that includes a half-rate DFE equalization function. The odd data receiving unit includes a data detection means, an edge detection means for detection on a half-rate DFE equalized signal, and an edge detection means for detection on a non-half-rate DFE equalized signal. The even data receiving unit includes a data detection means and an edge detection means for detection on a half-rate DFE equalized signal and an edge detection means for detection on a non-half-rate DFE equalized signal. The decision feedback equalization apparatus also comprises a pattern filter that includes means for receiving a set of sampling data by the detection means and for detecting a data pattern three consecutive bits of which are 110 or 001 and a data pattern three consecutive bits of which are 101 or 010. The means of the pattern filter selects edge data based on a result of the detection so that edge data on the half-rate DFE equalized signal will be selected on detection of the data pattern of 110 or 001 and so that edge data on the non-half-rate DFE equalized signal will be selected on detection of the data detection pattern of 101 or 010.

According to the present invention, it is possible to adjust the phase of the recovered clock in case of using half-rate decision feedback equalization. According to the present invention, it is possible to suppress distributions of the recovered clock and to improve data sampling accuracy as well as the communication quality.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Figure 1:
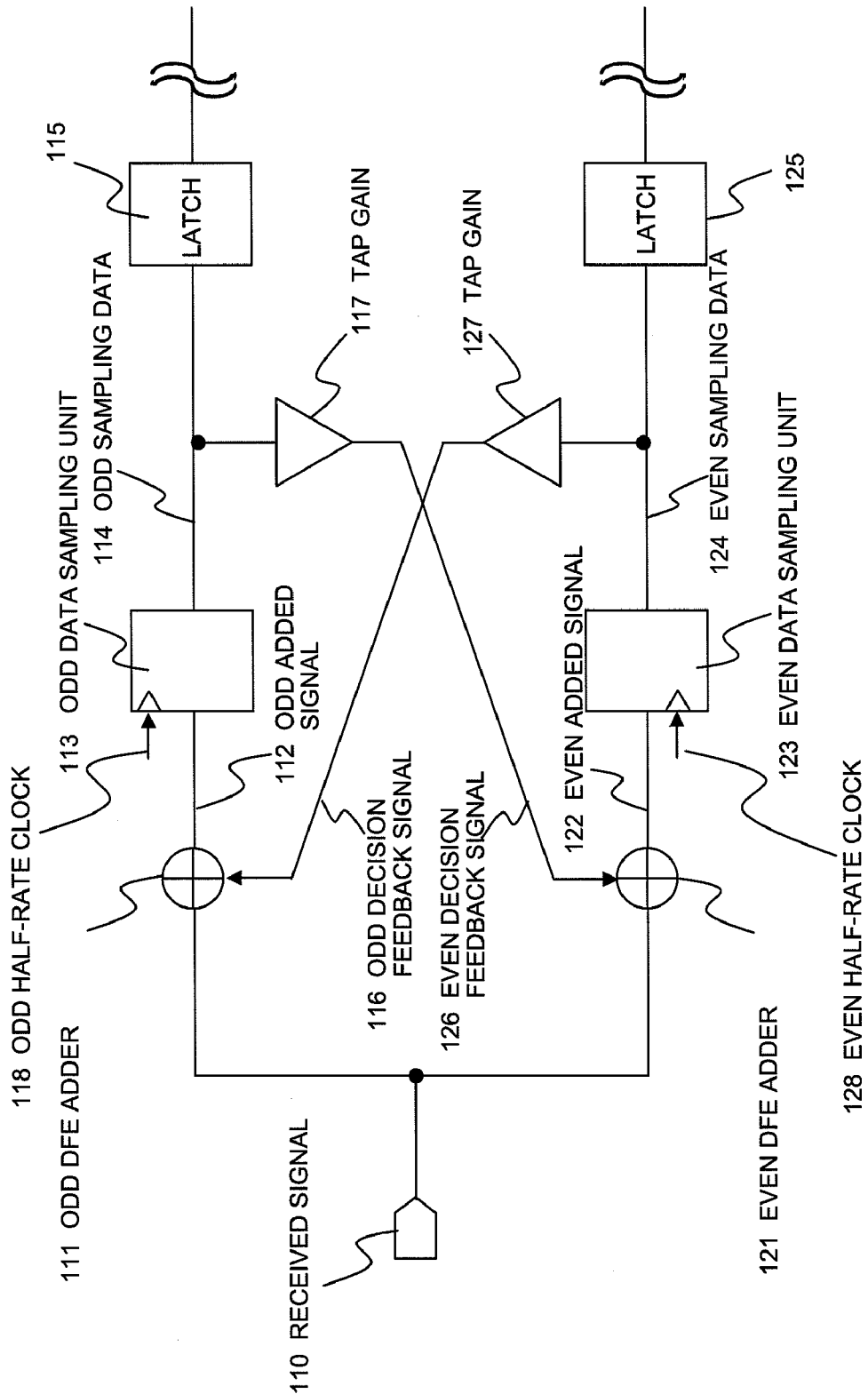
FIG. 1 is a block diagram for illustrating DFE operation of a double data rate system.
Figure 2:
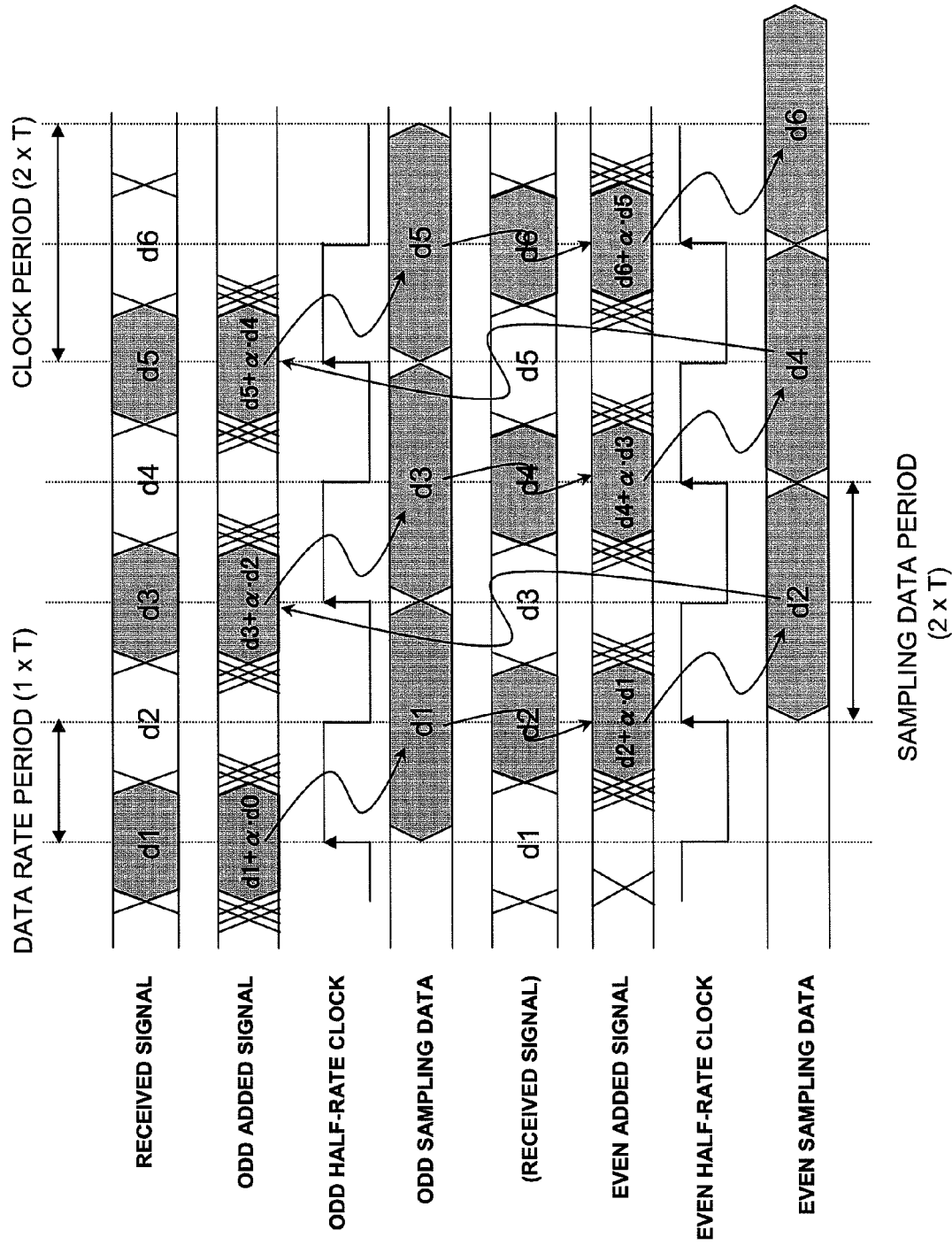
FIG. 2 is a timing diagram for illustrating reception and DFE operation of the double data rate system.

According to the present invention, there are provided an odd data receiving unit, an even data receiving unit, and a pattern filter. The odd data receiving which receives an odd data sampling clock, an odd edge sampling clock and a DFE input signal, includes a half-rate DFE equalization function. The even data receiving unit which receives an even data sampling clock, an even edge sampling clock and a DFE input signal, includes a half-rate DFE equalization function. The even data receiving unit and the odd data receiving unit each includes a data detection unit and an edge detection unit for data and edge detection on a half-rate DFE equalized signal. The pattern filter receives a set of sampling data by the detection units and includes a detection unit that detects a data pattern of three consecutive bits of 110 or 001 and that operates based on the detected result to select edge data on the half-rate DFE equalized signal only in case the detected pattern is the 110 or 001 pattern.

According to the present invention, there are provided an odd data receiving unit, an even data receiving unit, and a pattern filter. The odd data receiving unit which receives an odd data sampling clock, an odd edge sampling clock and a DFE input signal, includes a half-rate DFE equalization function. The even data receiving unit which receives an even data sampling clock, an even edge sampling clock and a DFE input signal, includes a half-rate DFE equalization function. The even data receiving unit and the odd data receiving unit each includes a data detection unit and an edge detection unit for data and edge detection on a half-rate DFE equalized signal, and an edge detection unit for edge detection on a non-half-rate DFE equalized signal. The pattern filter receives a set of sampling data by the detection units and includes a detection unit that detects a data pattern of three consecutive bits of 110 or 001 and a data pattern of three consecutive bits of 101 or 010. The pattern filter operates based on the detected result to select edge data on the half-rate DFE equalized signal in case the data pattern is the 110 or 001 pattern as well as to select edge data on the non-half-rate DFE equalized signal in case the data pattern is the 101 or 010 pattern.

According to the present invention, the pattern selector may be simplified in configuration by combining the pattern filter with the edge detection unit provided in the CDR. The pattern filter includes an EXOR operating mechanism for a detected data string of consecutive bits of the half-rate DFE equalized signal and a mechanism that selects the result of edge detection on the half-rate DFE equalized signal or the result of edge detection on the non-half-rate DFE equalized signal based on the result of the operation.

According to the present invention, there is provided a mechanism that cancels the offset in the data sampling unit and the edge sampling unit of the half-rate DFE equalized signal to improve the error rate.

According to the present invention, there is provided, in parallel with a data detection unit on the half-rate DFE equalized signal, an amplitude error sampling mechanism capable of adjusting a sampling threshold value to enable adaptive DFE equalization, thereby enabling adaptive DFE equalization in the receiving circuit.

In the half-rate DFE, a decision feedback signal, optimized to the ISI, influencing given data, has a period twice the data rate (2T).

Figure 4:
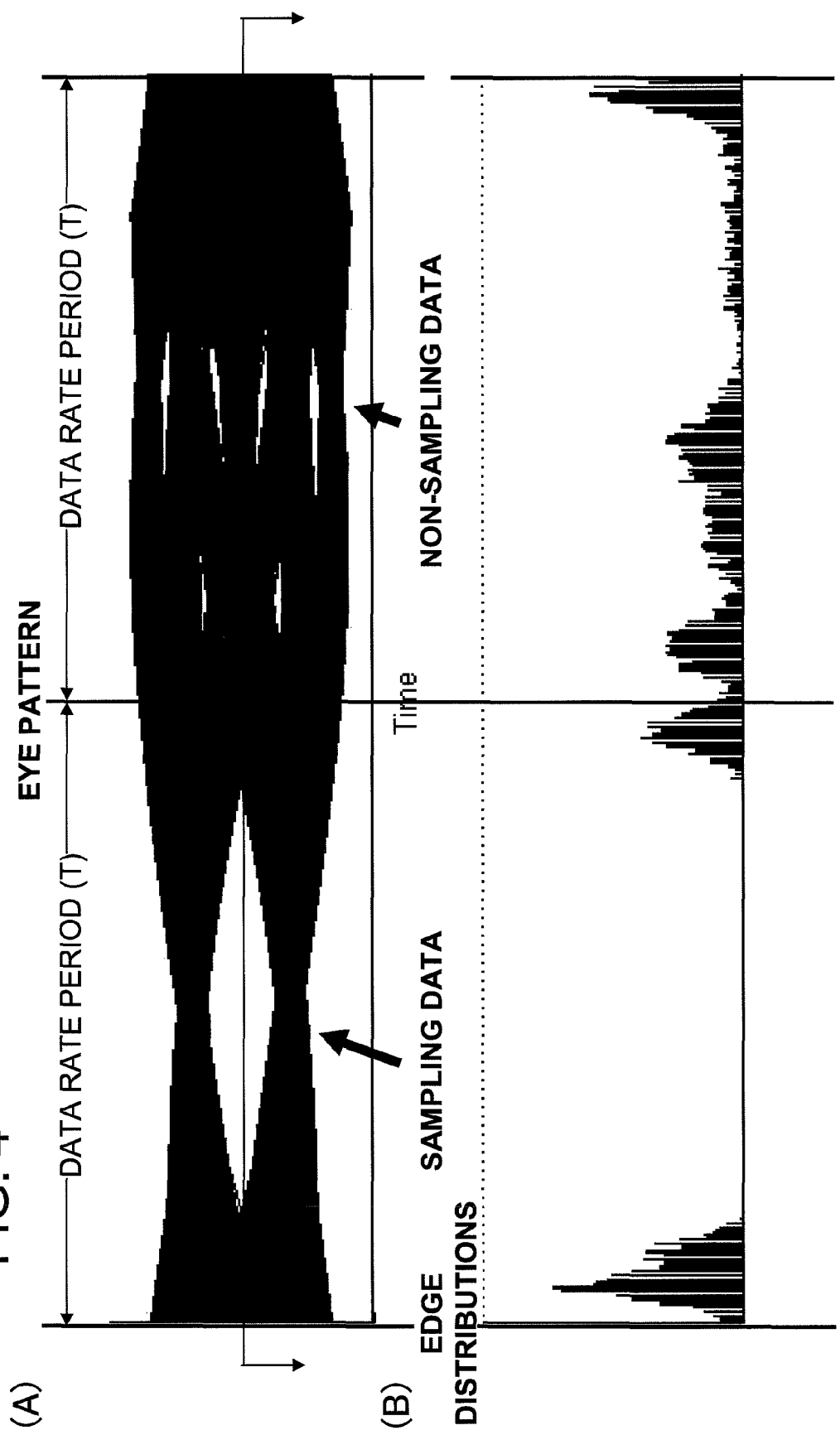
FIG. 4 shows an example of an eye pattern and edge distributions obtained on half-rate DFE.

The wide-range edge distribution of (B) of FIG. 4 may be attributed to the fact that the decision feedback signal with a 2-bit width is optimized for the first bit data, while it is not optimized for the second bit data.

The decision feedback signal, optimized for the first bit, is added to the waveform of the second bit, even though the value of the first bit differs from the second bit. Hence, the decision feedback signal, which is not proper, is added to the waveform of the second bit, thus closing one of the eye patterns.

Figure 3:
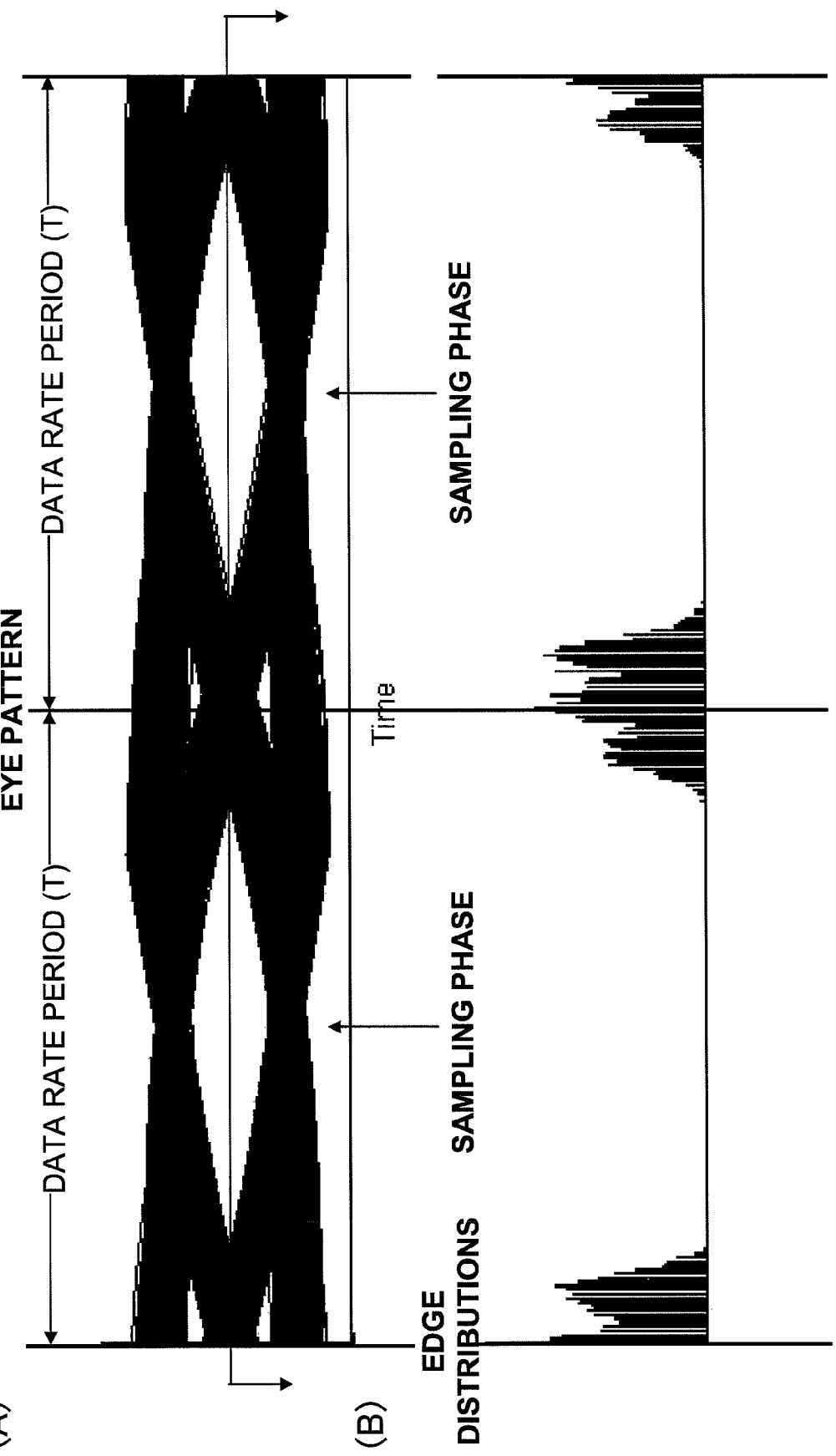
FIG. 3 shows an example of eye patterns and edge distributions obtained on full-rate DFE.

However, if it is supposed that the first bit data and the second bit data are influenced by the same influencing quantity of ISI, the two data are influenced similarly by the ISI, so that the two data are waveform-equalized in a proper manner. Under this supposed state, the full-rate DFE, shown in FIG. 3, and the half-rate DFE, are of the same edge distribution. In this case, the half-rate clock phase may correctly be adjusted by the CDR. Thus, by using only edge data of the timing that fulfills this supposition for the CDR, it is possible for the CDR to correctly adjust the phase even with half-rate DFE to lead to solution of the above-described problem.

This condition will now be described with reference to FIG. 5 and certain mathematical expressions.

Figure 5:
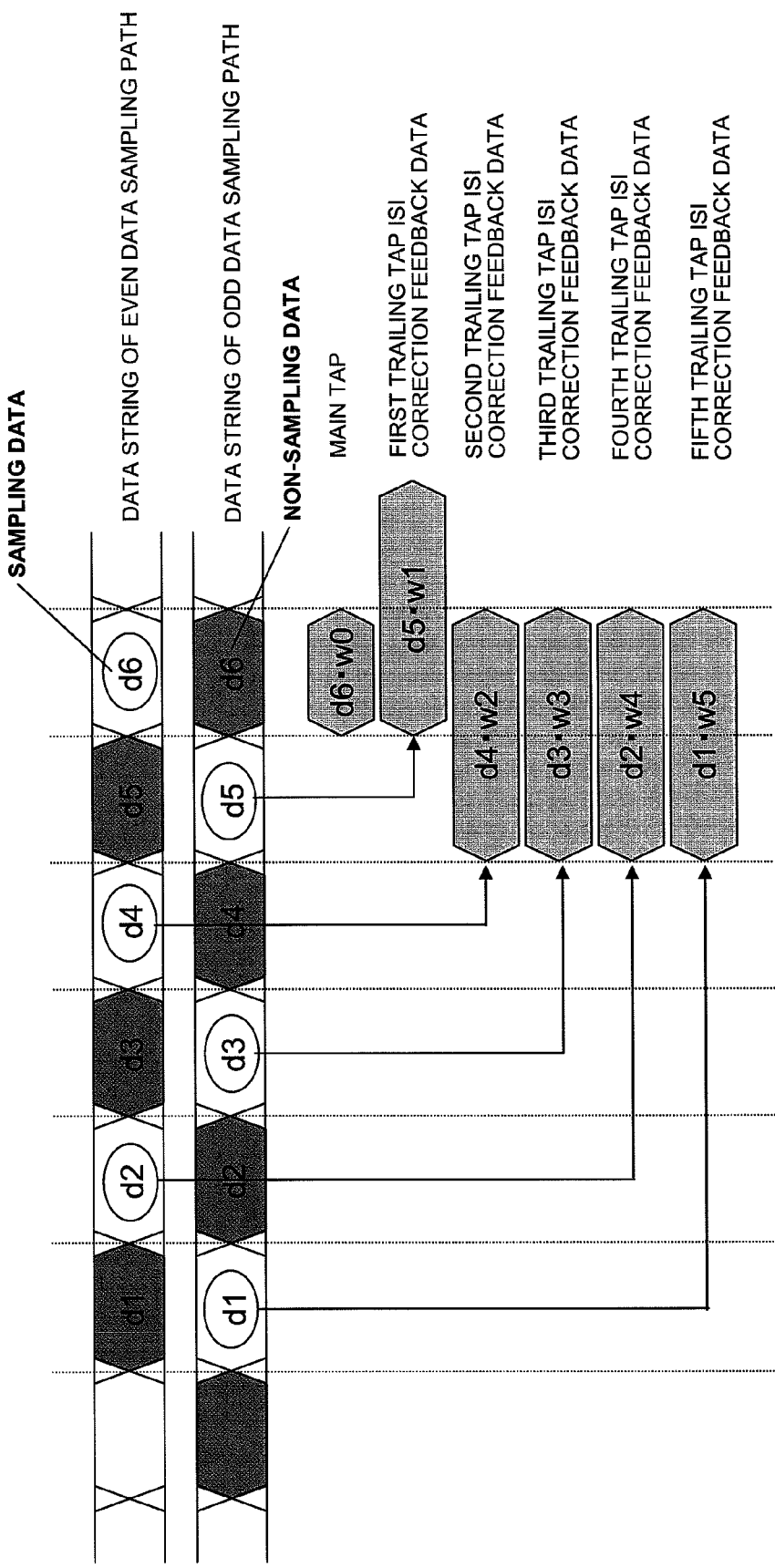
FIG. 5 is a timing diagram for illustrating the operation of the half-rate DFE.

FIG. 5 depicts a timing diagram for illustrating an example of the operation of the half-rate DFE for removing the influencing quantity of ISI for the trailing 5 bits, referred to below as 5-tap DFE. It is noted however that the present invention is not limited to the number of taps equal to 5.

The received data are separated into two parallel paths. The data at the sampling timing of these two paths are waveform-equalized by half-rate DFE. The two parallel paths are termed 'an odd data sampling path' and 'an even data sampling path' in the description to follow.

In the example of FIG. 5, the odd data sampling path samples a data string of d1, d3, d5 and so forth, while the even data sampling path' samples a data string of d2, d4, d6 and so forth. The odd and even data sampling paths sample the data alternately.

It is noted that attention is to be focused on the waveform of the data d6 following the half-rate DFE of on each data sampling path. The signal level of the data d6 on the even data sampling path is expressed by the equation (I), while that of the same data d6 on the odd data sampling path is expressed by the equation (II).

The sampling data d6 for half-rate DFE:

$$\text{dfe.even}(d6) = d6 \times w0 + d5 \times w1 + d4 \times w2 + d3 \times w3 + d2 \times w4 + d1 \times w5 \tag{I}$$

The non-sampling data d6 for half-rate DFE:

$$\text{dfe.odd}(d6) = d6 \times w0 + d4 \times w1 + d3 \times w2 + d2 \times w3 + d1 \times w4 + d0 \times w5 \tag{II}$$

Referring to FIG. 5, the meaning of variables wn of the equations (I) and (II), where n denotes an integer, is as follows:

w0: a DFE tap coefficient for a main tap bit (d6);
w1: a DFE tap coefficient for the trailing first bit (d5);
w2: a DFE tap coefficient for the trailing second bit (d4)
. . .
wn: a DFE tap coefficient for the trailing n'th bit.

In order for the non-sampling data signal of the equation (11) to be correctly equalized by DFE, the signal must be equal in signal level to the following signal for full-rate DFE:

Sampling data d6 for full-rate DFE:

$$\text{dfe.full}(d6) = d6 \times w0 + d5 \times w1 + d4 \times w2 + d3 \times w3 + d2 \times w4 + d1 \times w5 \tag{III}$$

Thus, under conditions where the equation (II) is equal to the equation (III), the waveform obtained with the half-rate DFE is equivalent to that obtained with the full-rate DFE. That is, under those conditions, the edges of the same timing may be extracted with the half-rate DFE as with the full-rate DFE.

The conditions where the equation (II) is equal to the equation (III) include:

$$d4=d5, d3=d4, d2=d3, d1=d2, d0=d1, d(-1)=d0; \text{ and} \quad (a)$$

$$w1=w2=w3=\ldots w5=0. \quad (b)$$

The condition (b) is excluded because it means that DFE tap coefficients are all zero and hence that equalization is not used. As a result, the condition (a) represents the condition under which the correct edge that is desirably used may be obtained.

This condition (a) is rewritten to $$d1=d2=d3=d4=d5$$

Thus, the condition under which the same edge timing may be obtained with the half-rate DFE as with full-rate DFE is that the same data occurs in succession before occurrence of data transition.

From the above consideration, data before d6 are preferably the same data for all time. However, such indicates that the same data are transmitted for all time. The data transmission of this sort may, of course, not be entitled to data communication.

It should be noted however that wn, where n is 0, 1, 2 and so forth, are coefficients for correcting for an amount of ISI. These coefficients are determined by the amount of ISI on trailing side bits.

Figure 6:
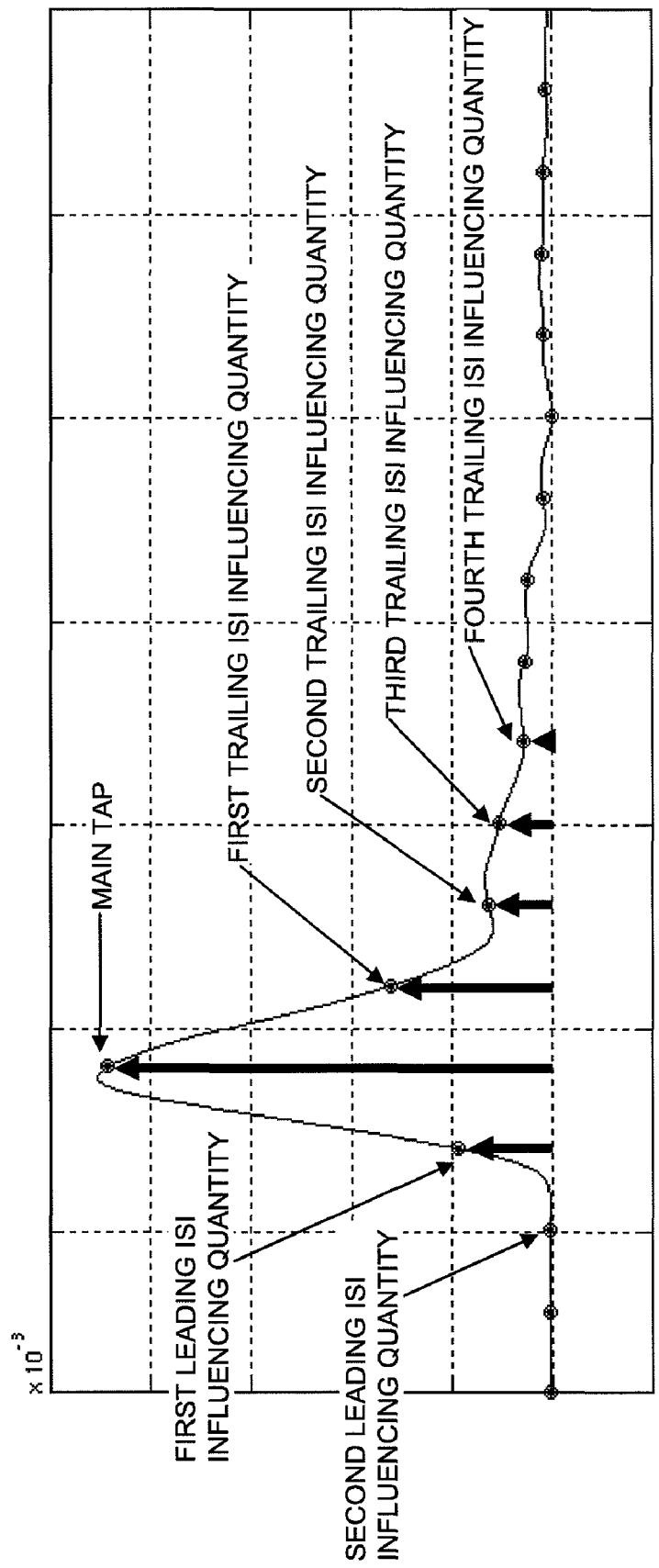
FIG. 6 is a graph for illustrating the quantity of the inter-symbol interference at each tap on a routine transmission line.

In the routine backplane communication transmission line, such as FR4, the amount of the ISI on the trailing side bits tend to decrease gradually, as shown in FIG. 6.

In particular, the first backward ISI amount w1 is appreciably larger than the second and the following ISI amount w2, w3 and so forth. In general, the tendency of w1>>w2, w3, w4 and so forth is outstanding.

In short, the difference at the influencing quantity at the first backward ISI (influencing quantity w1), that is the absolute value |d5−d4|, plays a decisive role in the difference between the equations (II) and (III).

As a result, it is practically possible to detect an edge position for the half-rate DFE at substantially the same position as that for the full-rate DFE if d5 and d4, which are 2-bit data directly previous to the sampling data, are equal to each other.

Thus, if the edge is to be detected from the waveform after passage through the half-rate DFE stage, only such data transitions in which data directly before the edge and data two bits before the edge are the same, more specifically, in which the data sequence is of a pattern of "0→0→1" or "1→1→0", need to be detected by a pattern filter and used as edge data for the CDR. That is, doing so detects an edge timing similar to that in case of the full-rate DFE. It should be noted that, in the above discussions, the transmission of binary signals of "0" and "1" is presupposed.

The processing of filtering by the pattern filter, as proposed by the present invention, enables detection of the edge similar to that detected with the full-rate DFE. However, another problem connected with a deteriorated jitter tolerance characteristic of a CDR may be incurred.

This is due to negligence of 010 and 101 patterns, other than 001 and 110, in connection with transitions of the previous data of 01 and 10, by the data pattern filter. About one-half of edges thus cannot be used for phase adjustment by the CDR in case of communication of random data.

Further, in generally used 8B10B encoding, the patterns of 01 alternations are present continually. Hence, edge detection is not possible with the above pattern filter, such that edges of the 010 and 101 patterns cannot be discounted.

To eliminate this problem, the present invention proposes detecting the edges of data transitions from 010 and 101 from a waveform not equalized by half-rate DFE.

The eye patterns of the waveforms, received before DFE, are closed. The frequency components of patterns of "01" alternations are substantially constant. The edge variations are small, such that filtering may sufficiently be achieved with a low-pass filter (LPF) ordinarily used as the CDR function.

The edges of 010 and 101 data and those of 110 and 110 data are received simultaneously by parallel paths. However, there is produced a difference in delay depending on whether or not the data have been passed through the DFE circuit.

Hence, the edge path for 010 data and for 101 data may cancel the signal delay difference by transmitting the data through a adder of zero DFE coefficient or by having delay included into the signal.

It should be noted however that no data can be transmitted if data transmitted is perpetually alternation data of 1010 . . . , as with 001 data or 110 data. For this reason, data is filtered by a pattern field of a 3-bit pattern, as a more realistic solution.

The results of scrutiny on many standard boards indicate that edge variations can be suppressed with this 3-bit filter.

It is seen from above that, if, in the double data rate receiving system, employing the half-rate clock, a half-rate DFE configuration is used, clock recovery is made possible even with the use of half-rate DFE, as in the case of using the full-rate DFE, by (1) using the results of sampling of the half-rate DFE equalized waveform for edge data of a pattern of 110 or a pattern of 001, and (2) using the results of sampling of the non-DFE equalized waveform for edge data of a pattern of 101 or a pattern of 010.

The result is suppression of distribution of the recovered clock and improved accuracy in data sampling and in communication quality (bit error rate).

Figure 7:
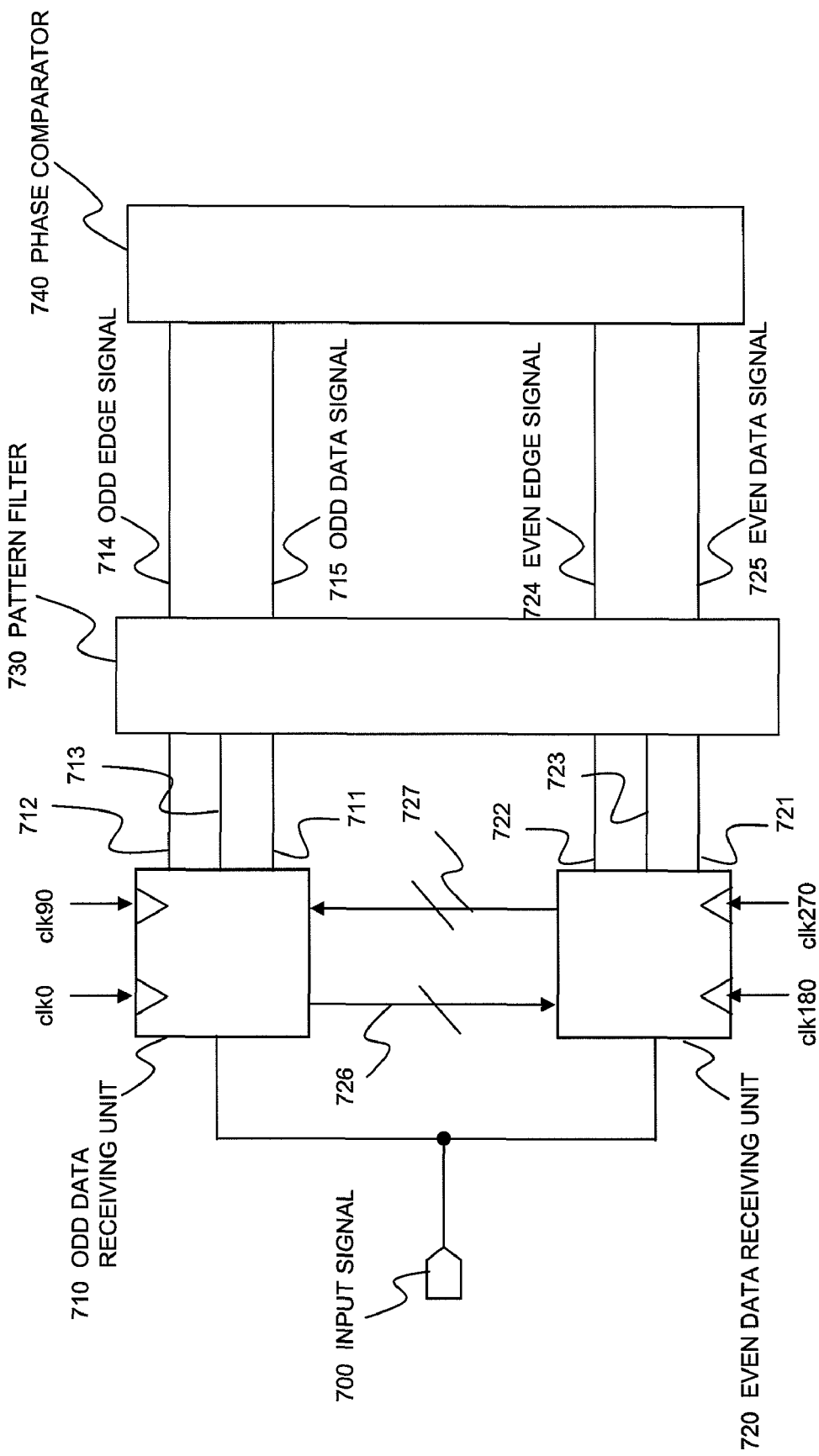
FIG. 7 is a schematic diagram showing the configuration of half-rate DFE and an edge detection block according to an exemplary embodiment of the present invention.
Figure 8:
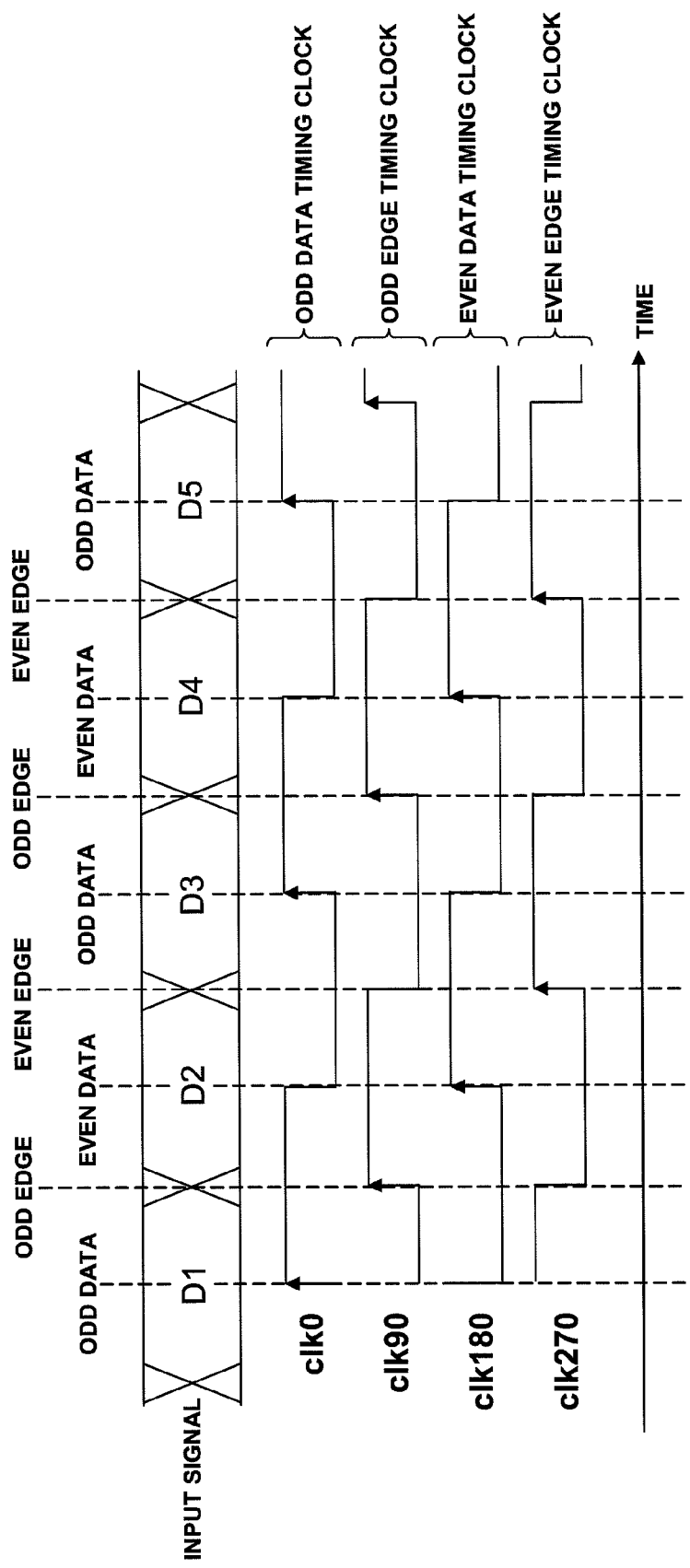
FIG. 8 is a timing diagram showing definitions of four-phase half-rate clocks, data and the edges.

FIG. 7 is a schematic view showing a configuration of an edge detection block, employing half-rate DFE, according to an exemplary embodiment of the present invention. Referring to FIG. 7, an input signal 700 is interleave-sampled in an odd data receiving unit 710 and an even data receiving unit 720, each at a half clock rate. For sampling the input signal, two pairs of differential half-rate clocks, each with a phase offset of 90 degrees (four-phase half-rate clocks), as shown in FIG. 8, are used. The input signal is subjected to double oversampling at even data timing, odd data timing and at edge timings.

Referring to FIG. 8, the odd data timing clock is clk0, the odd edge timing clock is clk90, with a phase shift of 90 degrees from clk0, the even data timing clock is clk180, with a phase shift of 180 degrees from clk0, and the even edge timing clock is clk270, with a phase shift of 270 degrees from clk0.

The odd data receiving unit 710 and the even data receiving unit 720 are each provided with a mechanism for sampling the half-rate DFE equalized waveform at a data timing and at an edge timing, and a mechanism for sampling the non-half-rate DFE equalized waveform at an edge timing.

That is, the odd data receiving unit 710
  samples the half-rate DFE equalized waveform at a data timing, using the clock clk0, to output the result as a data decision data 711, and
  samples both the half-rate DFE equalized waveform and the non-half-rate DFE equalized waveform, at an edge timing, using the clock clk90, to output the result as edge decision data 712 and 713.

In similar manner, the even data receiving unit 720
samples the half-rate DFE equalized waveform at a data timing, with the clock clk180, to output the result as a data decision data 721, and
samples both the half-rate DFE equalized waveform and the non-half-rate DFE equalized waveform, at an edge timing, using the clock clk270, to output the result as edge decision data 722 and 723. The odd data receiving unit 710 combines a result of processing of the DFE equalized waveform 727 by the even data receiving unit 720 with a result of processing of the DFE equalized waveform by the odd data receiving unit 710 to generate a decision feedback signal. The result of processing of the DFE equalized waveform 727 by the even data receiving unit 720 is a tap gain output at an odd stage, as later described, while the result of processing of the DFE equalized waveform by the odd data receiving unit 710 is a tap gain output at an even stage, also as later described. The even data receiving unit 720 combines the result of processing of the DFE equalized waveform 726 by the odd data receiving unit 710 with the result of processing of the DFE equalized waveform by the odd data receiving unit 710 to generate a decision feedback signal. The result of processing of the DFE equalized waveform processing 726 by the odd data receiving unit is ea tap gain output at an odd stage, as later described, while the result of processing of the DFE equalized waveform by the odd data receiving unit 710 is a tap gain output at an even stage, also as later described.

A pattern filter 730 which receiving the above sampling data, selects, out of two sorts of the edge decision data (712 and 713; 722 and 723), sampled at odd and even edge timings, one of two sets of the edge timing data, depending on a data pattern of three consecutive bits, obtained from the data decision data 711 and 721 sampled at the odd and even data timings. Edge decision data 714 and 724 and data decision data 715 and 725, thus selected, are supplied to a phase comparator 740 of the CDR for use for a data reproducing operation by the CDR.

Figure 9:
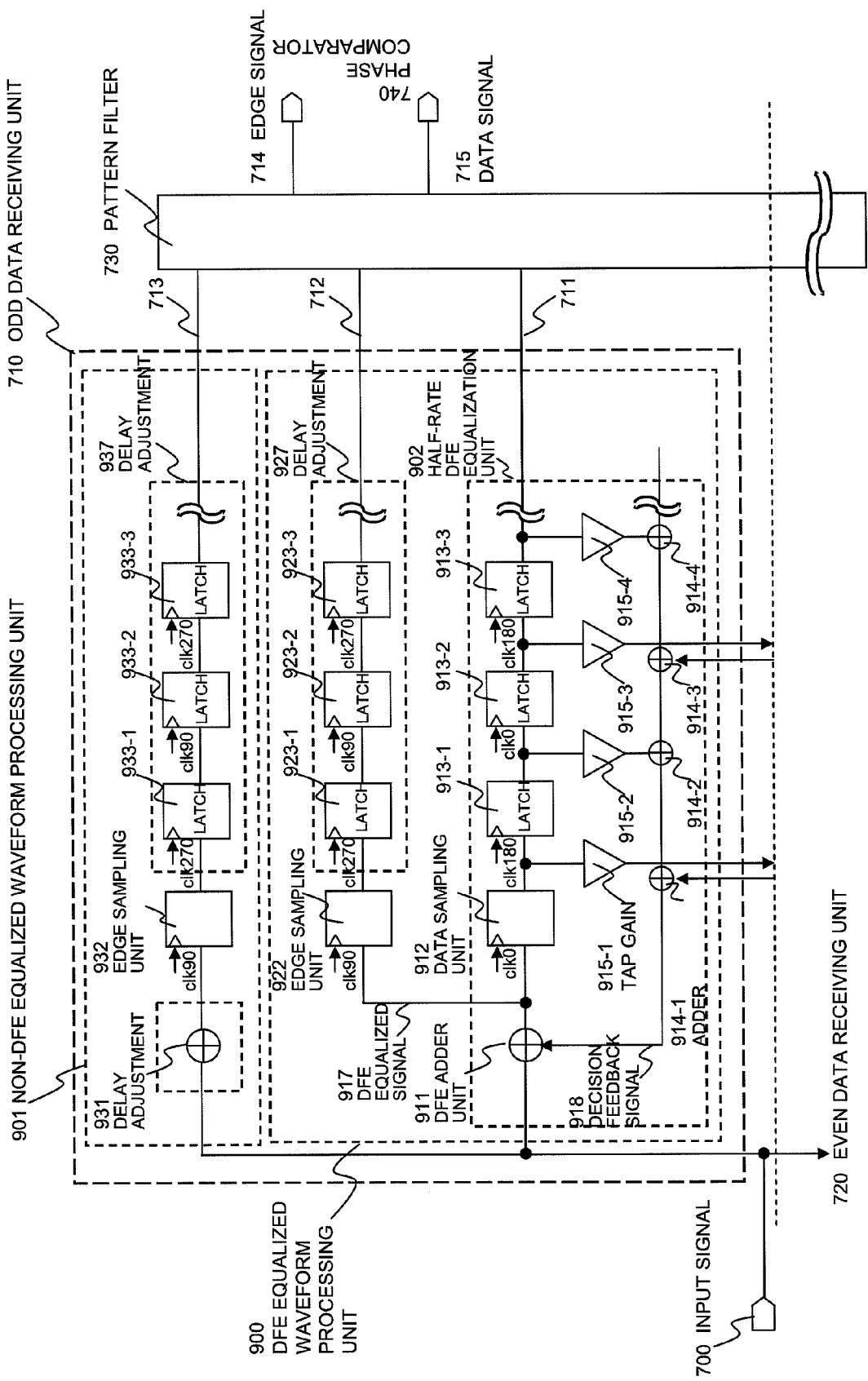
FIG. 9 is a block diagram showing an arrangement of an edge detection unit of half-rate DFE according to an exemplary embodiment of the present invention.

FIG. 9 shows an example of an arrangement of the odd data receiving unit 710 of FIG. 7. The even data receiving unit 720 of FIG. 7 is symmetrical with respect to the arrangement of the odd data receiving unit 710. If the odd-even relationship is interchanged, the clock clk0 (180) is interchanged with the clock clk180 (0) and the clock clk90 (270) is interchanged with the clock clk270 (90), the result is that the data receiving units 710, 720 are interchanged with each other.

The input signal 700 is branched to the odd data receiving unit 710 and to the even data receiving unit 720 so as to be then delivered to a DFE equalized waveform processing unit 900 and to a non-DFE equalized waveform processing unit 901 provided in each of the two data receiving units 710 and 720.

In the DFE equalized waveform processing unit 900, a DFE adder 911 adds an input signal 100 and a decision feedback signal 916 together to output a DFE equalized signal 917.

The DFE equalized signal 917 is sampled with clk0 by a data sampling unit 912, while being sampled with clk90 by an edge sampling unit 922.

The data decision data, sampled by the data sampling unit 912, are negatively fed back via a set of latches 913 and a set of tap gains 915 as a feedback decision signal 916 for use for DFE processing by the DFE adder 911. Outputs of the odd stages of the tap gains 915-1, 915-3 and so forth in the odd data receiving unit 710 are delivered to associated odd adders 914-1, 914-3 and so forth of the even data receiving unit 720 (726 in FIG. 7), respectively. Those outputs of the odd stage tap gains are then added to outputs of even stage tap gains 915-2, 915-4 and so forth of the even data receiving unit 720 to generate a decision feedback signal 918 which is then fed back to the DFE adder 911. Outputs of odd stage tap gains 915-1, 915-3 and so forth in the even data receiving unit 720 are delivered to associated odd adders 914-1, 914-3 and so forth of the odd data receiving unit 710 (727 in FIG. 7), respectively so as to be then added to outputs of the even stage tap gains 915-2, 915-4 and so forth of the odd data receiving unit 710 to generate a decision feedback signal 918 which is then fed back to the DFE adder 911.

The tap gain 915 is a gain stage corresponding to wn of the equation (I), where n denotes a natural number. After passing through the set of the latches, the data decision data are output as odd data decision data 711 to the pattern filter 730. Although the data decision data 711 is output from the last latch of the set of the latches 913, it does not matter from which latch the data is branched and output to the pattern filter.

The edge decision data, sampled by the edge sampling unit 922, is then delay-adjusted by a set of latches 923 so as to be output as the odd half-rate DFE equalized edge decision data 712 to the pattern filter 730.

In the non-DFE equalized waveform processing unit 901, the input signal 700 is delayed by delay adjustment 931 in an amount equivalent to the delay of the DFE adder 911. An edge sampling unit 932 samples the edge decision data of the non-DFE equalized waveform with the clock clk90 of the same timing as the sampling timing of the edge sampling unit 922.

In FIG. 9, there is shown an instance of delay adjustment 931 in which delay is adjusted using a dummy adder of the same configuration as the DFE adder 911 with one of input signals being a zero.

An output of the edge sampling unit 932 is delay-adjusted by a set of latches 933, in the same way as the edge decision data is delay-adjusted by the set of latches 923. The so delay-adjusted output of the edge sampling unit is output to the pattern filter 730. It should be noted however that delay adjustment is made at the data receiving units 710 and 720 to permit the pattern filter 730 to discriminate time-domain data obtained on sampling the data decision data 711 and that obtained on sampling the edge decision data 712 and 713.

FIG. 9 shows an example in which decision feedback signals of all tap outputs of DFE are added by the DFE adders 914 to form the decision feedback signal 916 before delivery to the DFE adder 911. However, the present invention is not limited to this configuration. It does not matter which configuration is used provided that decision feedback signals of all taps are added at the output of the DFE adder 911 such as by directly summing the decision feedback signal of each tap at each DFE adder.

The waveform-processed data, thus generated, are output to the pattern filter 730 to select edge decision data.

Figure 10:
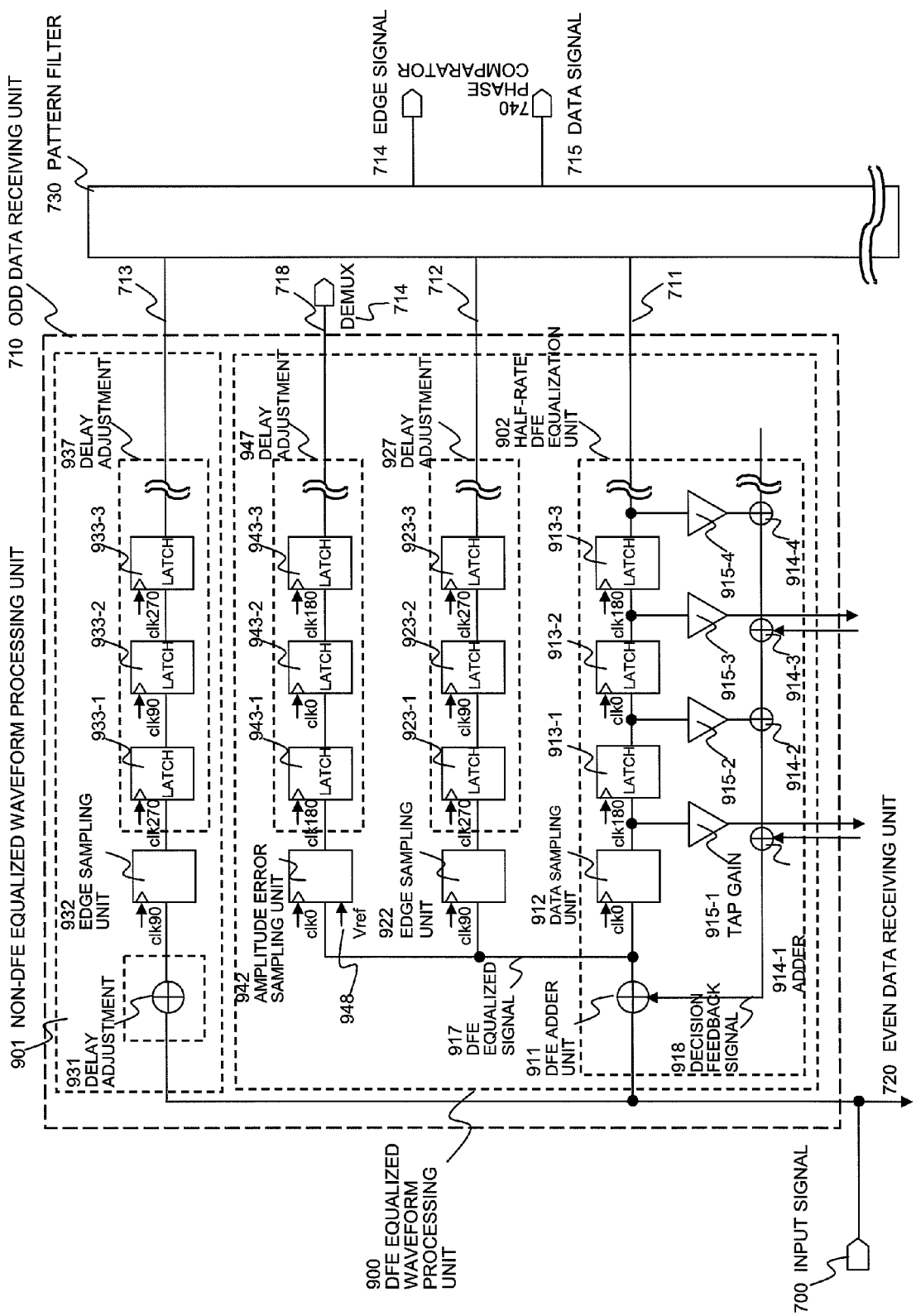
FIG. 10 is a block diagram showing another arrangement of an edge detection unit of half-rate DFE according to an exemplary embodiment of the present invention.

FIG. 10 shows a configuration of a front end of half-rate DFE provided with an offset canceling mechanism in case the sampling path and the sampling unit, needed for adjusting the DFE equalization coefficients, are arranged in a differential configuration.

Referring to FIG. 10, a sampling path for sampling the half-rate DFE equalized waveform by an amplitude error sampling unit 942 is provided in parallel with the data sampling unit 912 of FIG. 9. The amplitude error sampling unit 942 samples the result of comparison of an error decision reference potential 948 (Vref) on the half-rate DFE equalized signal 917 at a timing corresponding to clk0, as in the data sampling unit 912.

The amplitude error sampling unit 942 adjusts the delay in its output using e.g. a set of latches 943, as in the data sampling unit 912. The output of the amplitude error sampling unit is delivered to a demultiplexer (DEMUX) 750, as is the data decision data 711.

In the present invention, the sampling units may be of a single-ended configuration or of a differential configuration. In case of the differential configuration, there is a possibility that the sampling units 912, 922, 932 and 942 give a mistaken data decision due to an offset voltage of the differential pair generated in the sampling units 912, 922, 932 and 942 passed through by the signal.

In particular, in a transmission line having a large attenuation amount, in need of DFE equalization, an eye opening is small even after DFE equalization, thus presenting a problem at the time of the sampling.

Thus, the sampling units (the data sampling unit, edge sampling unit and the amplitude error sampling unit) may each be provided with an offset correction mechanism to improve the bit error rate (BER).

Figure 11:
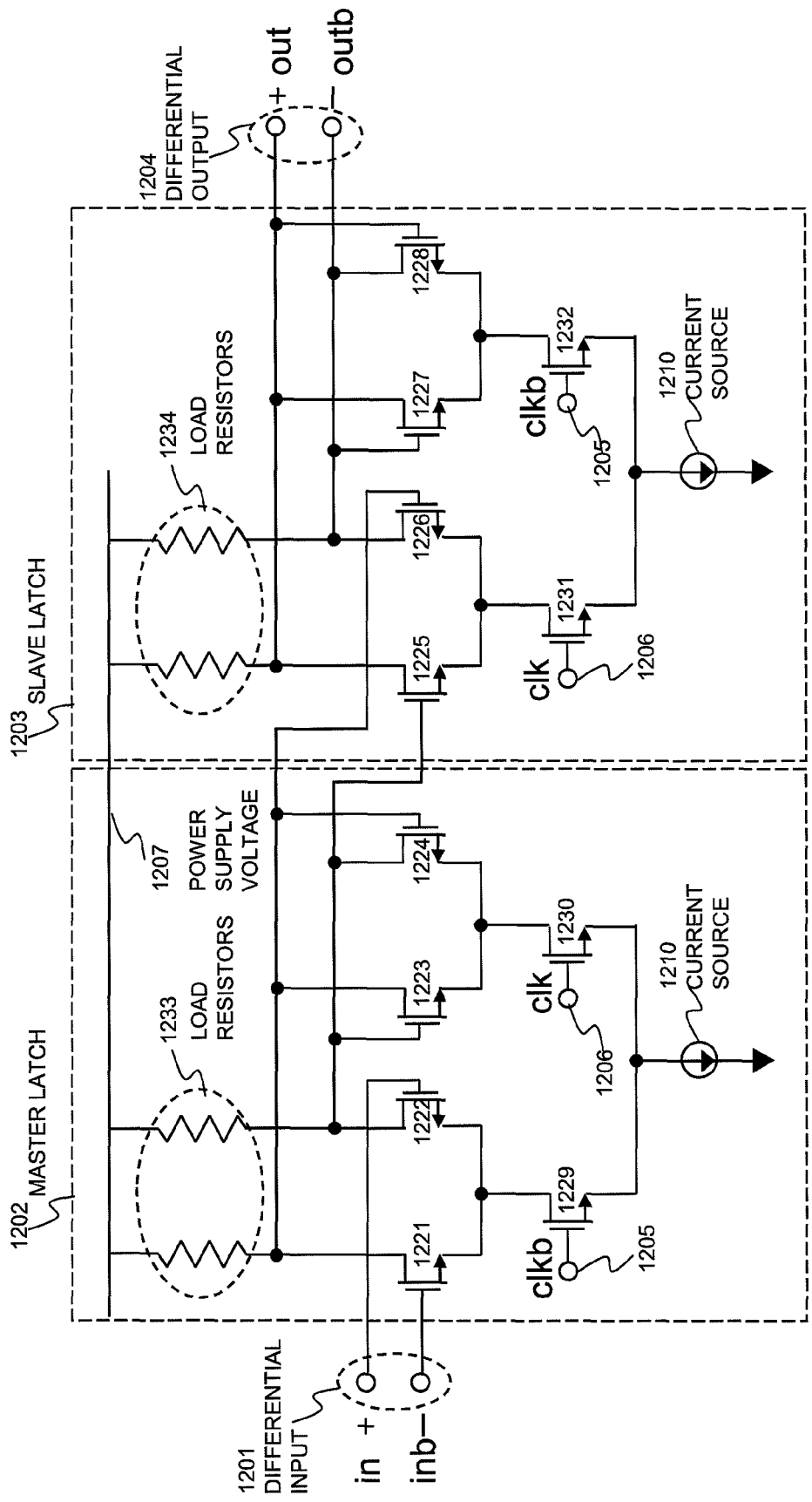
FIG. 11 is a circuit diagram showing an edge detection unit of half-rate DFE according to an exemplary embodiment of the present invention.
Figure 12:
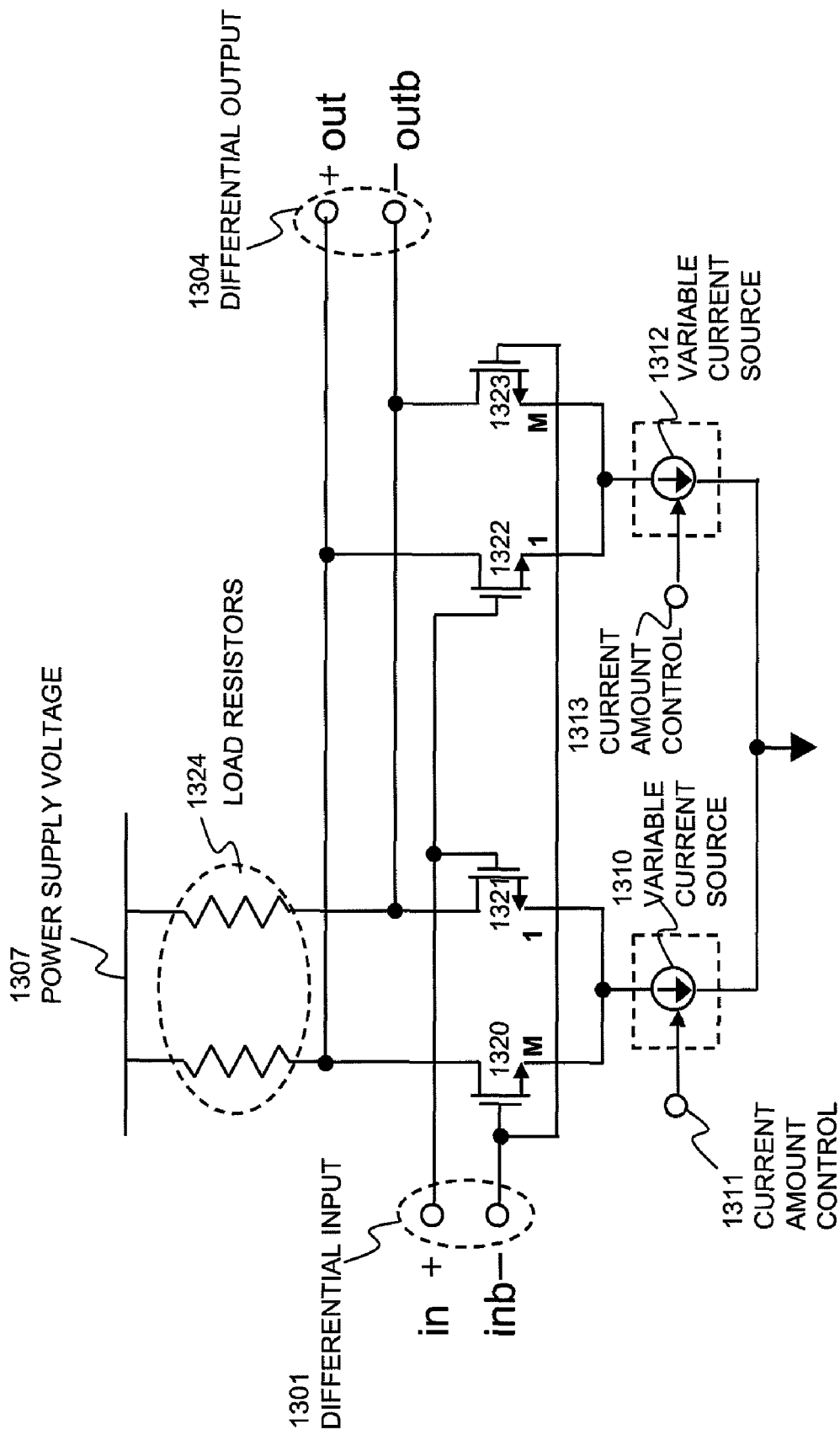
FIG. 12 is a circuit diagram showing an example of a sampling unit of a differential configuration.

FIG. 11 shows an example of a differential flip-flop of the sampling unit. FIG. 12 shows an example of an offset canceling mechanism for the differential flip-flop.

Referring to FIG. 11, a differential input 1201 (in, inb) is delivered to a differential transistor pair (1221, 1222) of a master latch 1202.

Clocks clk1205 and clk1206 form a differential clock pair. When a transistor 1229 is turned on by clkb1205, an input is accepted, that is, the differential transistor pair (1221, 1222) is activated. When a transistor 1230 is turned on by clk1206, the signal so accepted is latched. Simultaneously, the latched signal is delivered to a differential transistor pair (1225, 1226) of a slave latch 1203.

When a transistor 1232 is turned on, again by clkb1205, the signal accepted by the slave latch is latched. The so latched signal is delivered as a differential output 1204 to the latches 912, 922, 932 and 942 of the next stage and to the tap gains 915.

In the present Example, a differential latch with a single output (single-ended output) may also be used.

Among the mechanisms for canceling the offset of the differential signal, there is one that cancels the offset within the differential flip-flop, or one that has a pre-stage circuit that generates offset for the differential signal. FIG. 12 shows an example of the latter mechanism.

Referring to FIG. 12, a differential input is delivered to two differential pairs (1320, 1321) and (1322, 1323), the drain terminals of which are connected in common. The transistors 1320 and 1323 are equal in size to each other, while the transistors 1321 and 1322 are also equal in size to each other. The ratio of driving capabilities of the transistors 1320 and 1321 is set to M:1, while that of the transistors 1323 and 1322 is also set to M:1.

The source terminals of the differential transistor pair (1320, 1321) are connected in common to a variable current source 1310, while the source terminals of the differential transistor pair (1322, 1323) are connected to a variable current source 1312.

The current amounts of the variable current sources 1310 and 1312 are controlled by current amount control signals 1311 and 1313, respectively.

The ratio of current amounts of the variable current sources 1310 and 1312, for example, is controlled by an externally controlled digital-to-analog converter DAC, by way of controlling the current amount, thereby generating different offsets at a differential output 1304.

By providing the above offset canceling mechanism in the sampling units 912, 922, 932 and 942, reception sensitivity may be improved over the case of not providing the offset canceling mechanism. In addition, it is unnecessary to increase the gate area for lowering the offset voltage.

In the illustrative arrangement, shown in FIG. 9, decision feedback signals of all of the DFE tap outputs are added by the adder 914, before being supplied to the DFE adder 911, to constitute the decision feedback signal 916. However, the present invention is not limited to this configuration. It does not matter which configuration is used provided that decision feedback signals of all taps are added at the output of the DFE adder 911 such as by directly summing the decision feedback signals of the respective taps at the respective DFE adders.

Figure 13:
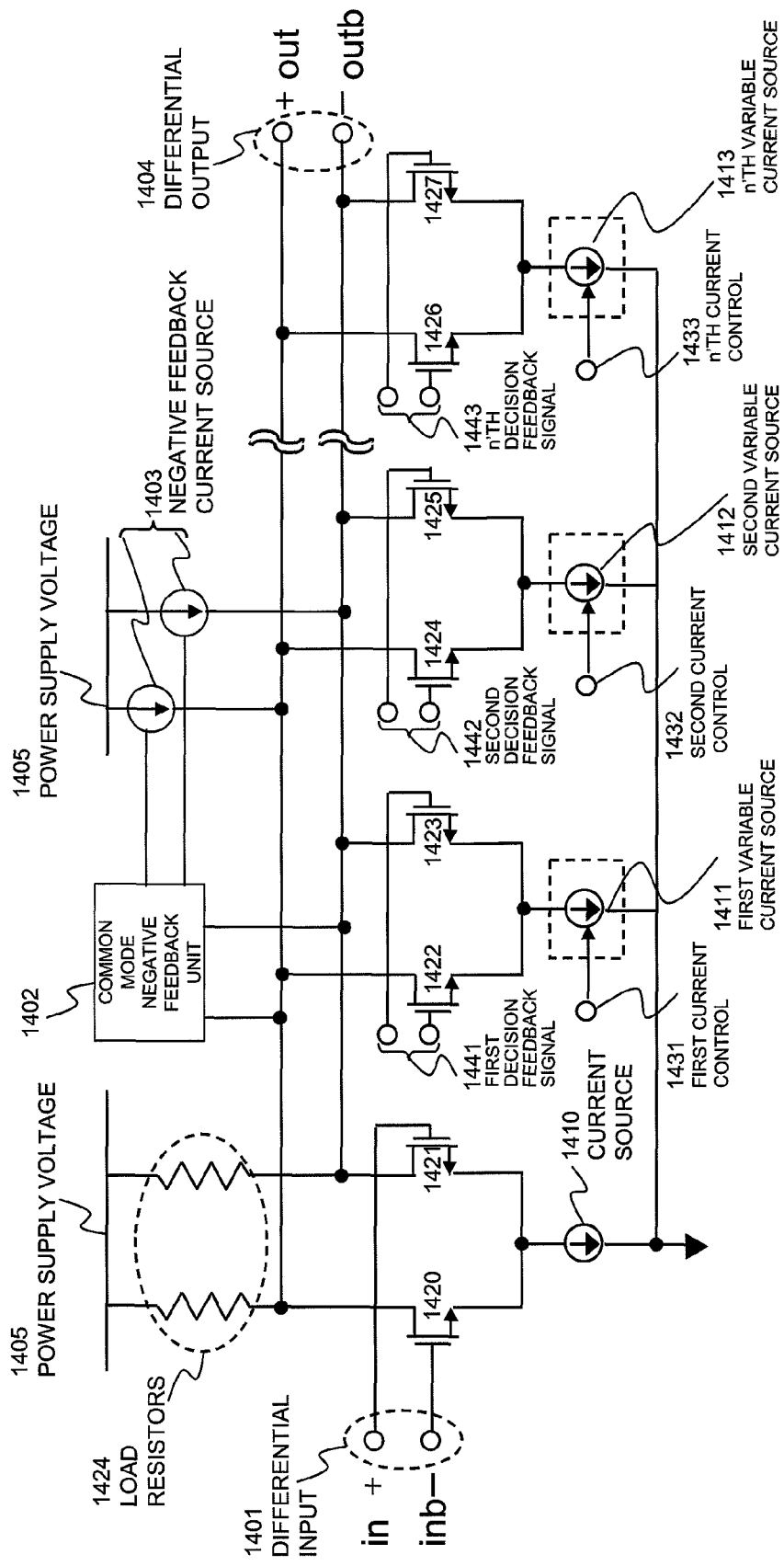
FIG. 13 is a circuit diagram showing an example of an n-tap DFE adder.

FIG. 13 shows an example of directly adding the decision feedback signals of the respective taps by the DFE adder 911. Referring to FIG. 13, a signal at a differential input 1401 is supplied to a differential amplifier circuit of the initial stage made up of a current source 1410, a differential pair (1420, 1421) and load resistors 1424. A first decision feedback signal 1441, a second decision feedback signal 1442 and so forth up to an n'th decision feedback signal 1443 are negatively fed back to a differential output 1404.

FIG. 13 shows an example in which the decision feedback signal is differential. The first decision feedback signal 1441 is differentially delivered to the gates of a differential transistor pair (1422, 1423), the sources of which are connected in common and connected to a first variable current source 1411 and the drains of which are connected to the differential output 1404. In similar manner, the n'th decision feedback signal 1443 is differentially delivered to the gates of a differential transistor pair (1426, 1427), the sources of which are connected in common and connected to the n'th variable current source 1413 and the drains of which are connected to the differential output 1404. Sign adjustment of the respective decision feedback signals is by any of suitable routine techniques (known techniques), although such technique is not shown in FIG. 13.

The tap gain for each decision signal may be generated by controlling the first, second and n'th variable current sources 1411, 1412 and 1413 by current control signals 1431, 1432 and 1433, respectively. The operation equivalent to that of the tap gain 915 may thereby be carried out simultaneously.

In the present example, common mode control by common mode negative feedback 1402 is carried out for the differential output 1404.

The waveform-processed data, thus generated, is delivered to the pattern filter 730 where edge decision data is selected.

It is seen from above that, from the eye openings of every two bits, shown in FIG. 4, data decision data and edge decision data may be obtained from the half-rate DFE equalized waveform, while edge decision data may be obtained from the non-half rate DFE decision data, in accordance with an interleaving system.

The configuration of the pattern filter 730, which generates the edge timing of the same timing as that obtained with full-rate DFE from the half-rate DFE equalized data and from non-half rate DFE decision data, will now be described.

In case the data decision data string is of the 110 or 001 pattern, the data transition timing of the half rate DFE equalized data and that of the non-half rate DFE decision data become approximately equal to the data transition timing of the full-rate DFE equalized data.

In case the data decision data string is of the 101 or 010 pattern, the data transition timing of the non-half rate DFE equalized data becomes approximately equal to the data transition timing of the full-rate DFE equalized data.

In case this 3-bit pattern is to be filtered, a commonplace logic may be used. However, a 3-bit pattern filter has a wide area.

Thus, the pattern filter 730 effects pattern filtering of former two of the three bits and an edge detection means of the phase comparator 740 is used in combination to effect pattern filtering of three bits of 110 and 001 as well as 101 and 010 to reduce the pattern filter size.

The circuit configuration of the pattern filter of the present example, and the method for operating the same, will now be described. A generally used double rate over-sampling CDR includes the customary phase comparator 740 for comparing a signal phase with a clock phase to detect data transition (edge) needed for clock recovery, and thus has the function of detecting an edge timing.

Figure 14:
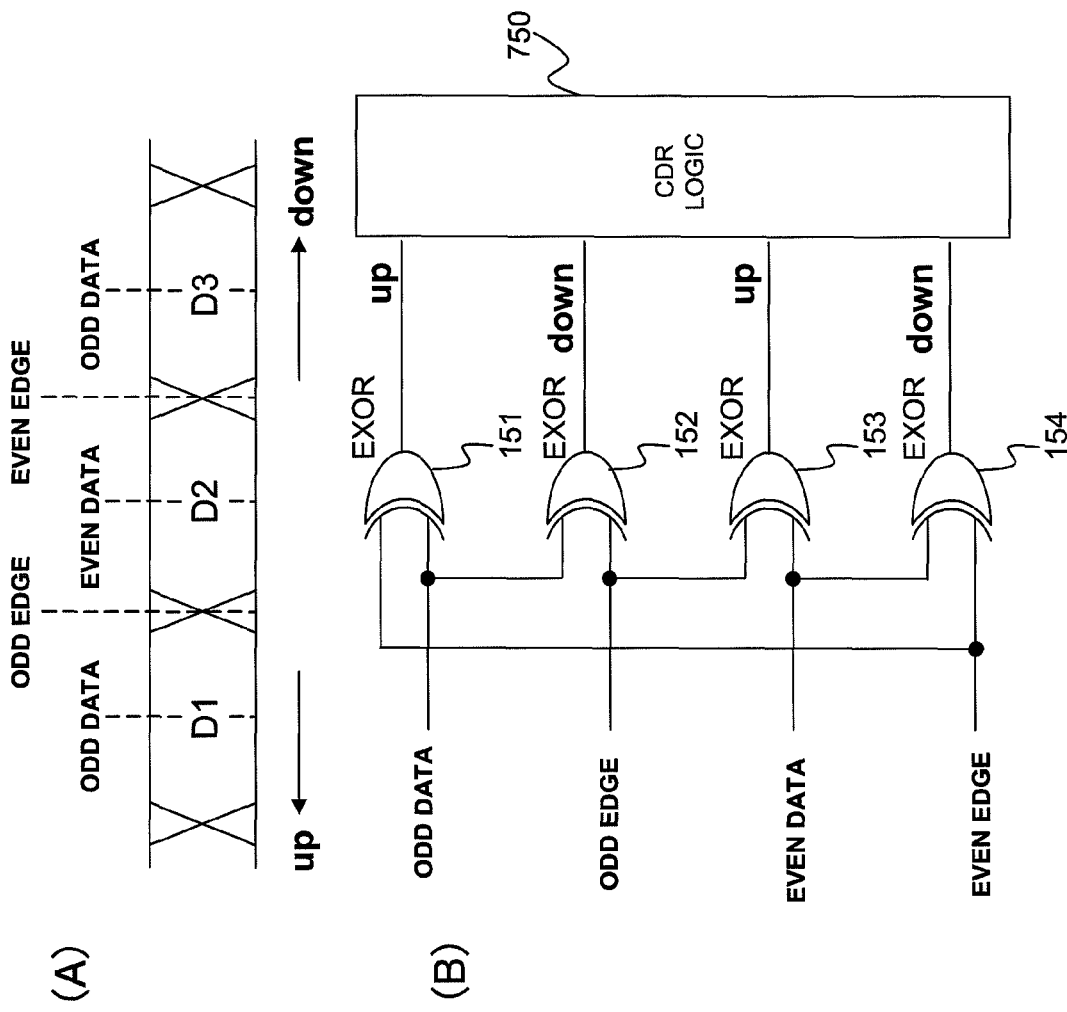
FIG. 14 is a schematic view showing an example of a phase comparator.

FIG. 14 shows an example of the phase comparator 740.

The phase comparator 740 performs
an exclusive-OR (EXOR) operation of an odd data and an odd edge,
an exclusive-OR (EXOR) operation of an odd edge and an even data,
an exclusive-OR (EXOR) operation of an even data and an even edge,
an exclusive-OR (EXOR) operation of an even edge and an odd data,
to adjust the phase of the recovered clock.

Figure 15:
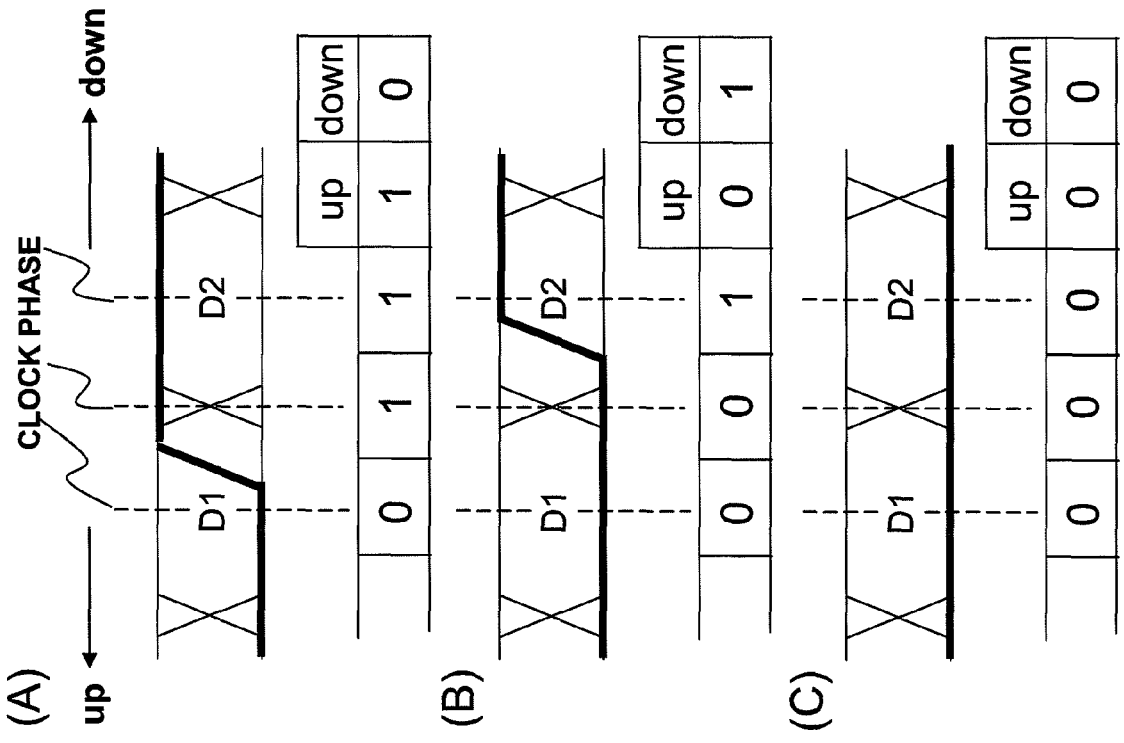
FIG. 15 is a diagram for illustrating certain examples of phase detection.

FIG. 15 shows examples of phase detection by the phase detector of FIG. 13. The edge timing in data transition from 0 to 1 is such that, in the signal state of (A) of FIG. 15, an up-signal=1 and a down-signal=0, as a result of the EXOR operation. A CDR logic 750 then exercises control to shift the clock phase towards the up-side.

In the signal state of (B) of FIG. 15, the up-signal=0 and the down-signal=1. The CDR logic 750 then exercises control to shift the clock phase towards the down-side.

If data shift is from 0 to 0, that is, there is no data transition, as in (C) of FIG. 15, the up-signal=0 and the down-signal=0. In this case, no adjustment is made of the clock phase.

That is, a mechanism for detecting the presence or non-presence of data transition (edge) for phase adjustment of the reproduced clock is equipped in the CDR.

This edge detection means may be used in place of pattern filtering of latter two bits of the three-bit pattern filter.

In case of using the phase comparator 740, it is unnecessary to filter a data string in the pattern filter 730 insofar as the transitions of the second and third bits 01 and 10 of the 001 and 110 patterns as the target data pattern, as well as those of the second and third bits 01 and 10 of the 101 and 010 patterns as the other target data pattern. It is only necessary to discriminate whether or not the former two bits are 00 and 11 as well as 01 and 10. As a result, the pattern filter may be simplified.

Thus, with the pattern filter, the result of the exclusive-OR (EXOR) operation on the former two bits (00, 11) is 0, insofar as detection of 001 and 110 patterns is concerned, while the result of the EXOR operation on the former two bits (01, 10) is 1, insofar as detection of 101 and 010 patterns is concerned It is sufficient if the result of edge detection with the DFE equalized waveform or that with the non-DFE equalized waveform is selected depending on the result of the EXOR operations.

Figure 16:
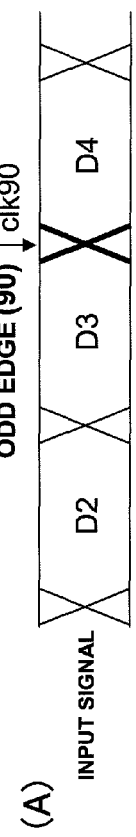
FIG. 16 is a diagram for illustrating the operation of a pattern filter.

FIG. 16 summarizes the operation of the present Example.

Since all of the edge data are used, it is necessary to use both the 'odd data-even data' and 'even data-odd data' in the case of the double data rate system. It is therefore necessary to keep one bit of data in the pattern filter.

Figure 17:
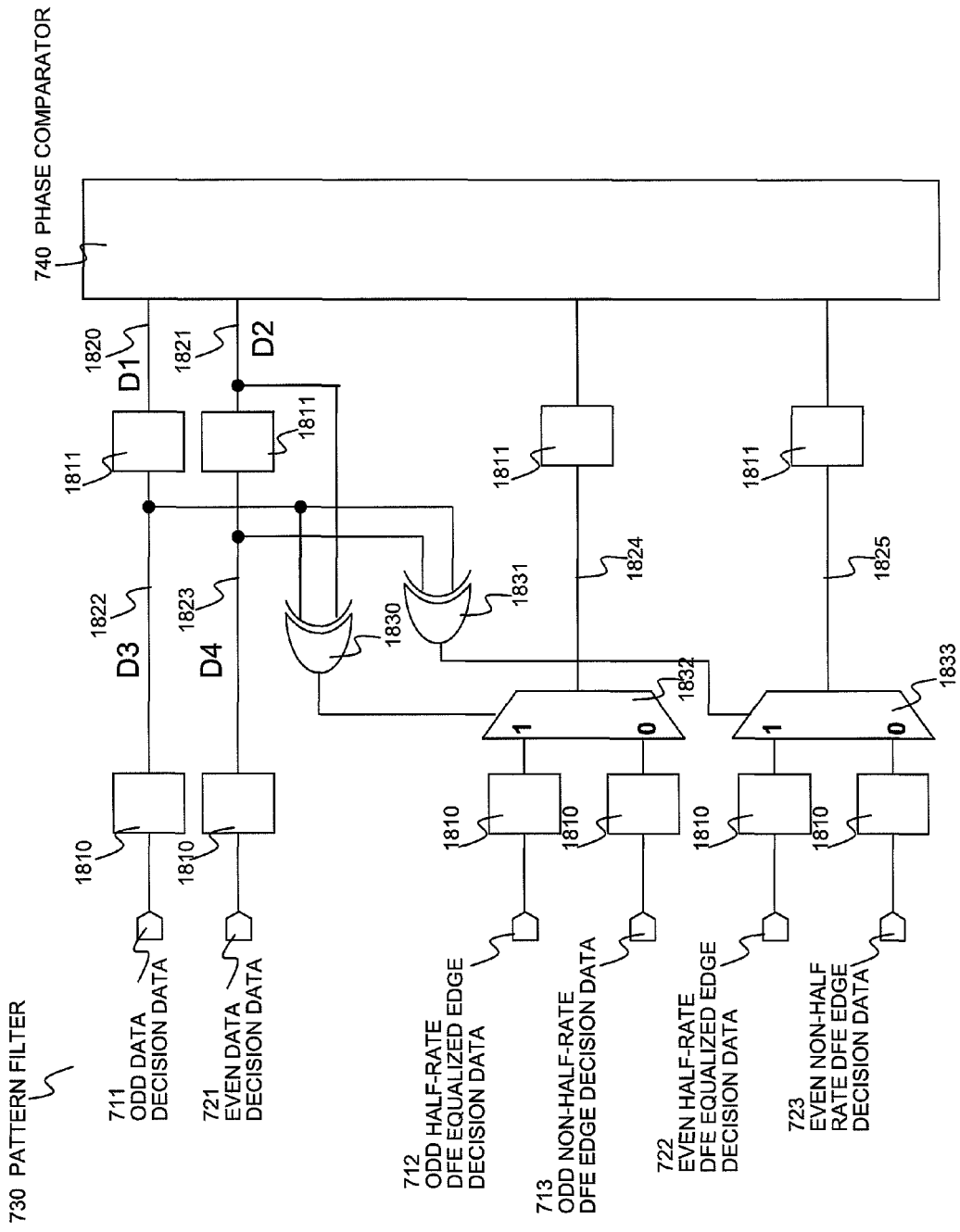
FIG. 17 is a block diagram showing an arrangement of a pattern filter.

FIG. 17 shows an example configuration of the pattern filter. It should be noted that a configuration other than the configuration of FIG. 17 may be used provided that the configuration used allows filtering of the pattern proposed by the present invention. Referring to FIG. 17, to the pattern filter 730 are delivered the odd data decision data 711, even data decision data 721, half-rate DFE equalized odd edge decision data 712, even edge decision data 722, odd edge decision data of the non-half rate DFE waveform 713 and the even edge decision data 723.

A flip-flop 1810 adjusts the timing of a set of input data.

An even data (D2) 1821 and an odd data (D3) 1822 are EXORed by an EXOR 1830. When the result of the operation indicates 1, a selector 1832 selects the odd half-rate DFE equalized edge decision data 712 and, when the result indicates 0, the selector 1832 selects the odd non-half-rate DFE edge decision data 713.

In similar manner, an odd data (D3) 1822 and an even data (D4) 1823 are EXORed by an EXOR 1831. When the result of the operation indicates 1, a selector 1833 selects the even half-rate DFE equalized edge decision data 722 and, when the result indicates 0, the selector 1833 selects the even non-half-rate DFE equalized edge decision data 723.

As a result, an edge data 1824 and an even edge data 1825, filtered with 00 and 01 and with 01 and 10, are produced.

The timing of data 1820, 1821 and that of edges 1824 and 1825 are adjusted by a flip-flop 1811. The timing adjusted data are output to the phase comparator 740 of the CDR shown in FIG. 15.

The ensuing operation is as described above, that is, if there is transition at the next data, the CDR exploits the data and, if there is no transition, the CDR discounts it. Hence, a targeted 3-bit pattern filter of 001 and 110 as well as 101 and 010 may be constructed on the whole.

By the above-described operation of the pattern filter 730 and the phase comparator 740, it is possible to correctly select the half-rate DFE equalized edge decision data and the non-half-rate DFE equalized edge decision data to output the so selected data to the CDR logic.

The present Example thus provides, in a double data rate receiving system that uses a half-rate clock, a method for edge extraction in which clock recovery similar to that with the full-rate DFE may be achieved even though the half-rate DFE configuration is used. This is made possible by using the result of sampling of the half-rate DFE equalized waveform for a 001 pattern and a 110 pattern, and by using the result of sampling of the non-half-rate DFE equalized waveform for a 101 pattern and for a 010 pattern. Correct adjustment of the recovered clock leads to improved data sampling accuracy and to the improved bit error rate.

Among the examples of practical use of the present invention, there are network equipment, such as servers or routers, and semiconductor devices used for storages.

The disclosure of the aforementioned Non-Patent Document 1 is incorporated by reference herein. The particular exemplary embodiments or examples may be modified or adjusted within the gamut of the entire disclosure of the present invention, inclusive of claims, based on the fundamental technical concept of the invention. Further, variegated combinations or selection of elements disclosed herein may be made within the framework of the claims. That is, the present invention may encompass various modifications or corrections that may occur to those skilled in the art in accordance with the within the gamut of the entire disclosure of the present invention, inclusive of claim and the technical concept of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An apparatus for decision feedback equalization (DFE) comprising:
    an odd data receiving unit that receives an odd data sampling clock, an odd edge sampling clock and a DFE input signal and that includes a half-rate DFE equalization function;
    an even data receiving unit that receives an even data sampling clock, an even edge sampling clock and the DFE input signal and that includes a half-rate DFE equalization function,
    the odd data receiving unit and the even data receiving unit each including a data detection unit and an edge detection unit that respectively perform data and edge detection on the half-rate DFE equalized signal; and
    a pattern filter that receives a set of sampling data by the detection units and that detects a data pattern, three consecutive bits of which are 110 or 001, the pattern filter, based on a result of the detection, selecting edge data on the half-rate DFE equalized signal when the data pattern of 110 or 001 is detected,
    wherein the odd data receiving unit implements the half-rate DFE equalization function using a decision feedback signal in the odd data receiving unit and a decision feedback signal in the even data receiving unit; and
    wherein the even data receiving unit implements the half-rate DFE equalization function using a decision feedback signal in the even data receiving unit and a decision feedback signal in the odd data receiving unit.

2. An apparatus for decision feedback equalization (DFE) comprising:
    an odd data receiving unit that receives an odd data sampling clock, an odd edge sampling clock and a DFE input signal and that includes a half-rate DFE equalization function;
    an even data receiving unit that receives an even data sampling clock, an even edge sampling clock and the DFE input signal and that includes a half-rate DFE equalization function,
    the odd data receiving unit and the even data receiving unit each including: a data detection unit and edge detection unit that respectively, perform data and edge detection on a half-rate DFE equalized signal; and an edge detection unit that performs edge detection on a non-half-rate DFE equalized signal; and
    a pattern filter that receives a set of sampling data by the detection units, the pattern filter detecting a data pattern, three consecutive bits of which are 110 or 001 and a data pattern, three consecutive bits of which are 101 or 010, the pattern filter, based on a result of the detection, selecting edge data detected on the half-rate DFE equalized signal, when the data pattern of 110 or 001 is detected, and selecting edge data detected on the non-half-rate DFE equalized signal when the data pattern of 101 or 010 is detected.

3. An apparatus for decision feedback equalization (DFE) comprising:
    an odd data receiving unit that receives an odd data sampling clock, an odd edge sampling clock and a DFE input signal and that includes a half-rate DFE equalization function;
    an even data receiving unit that receives an even data sampling clock, an even edge sampling clock and the DFE input signal and that includes a half-rate DFE equalization function,
    the odd data receiving unit and the even data receiving unit each including a data detection unit and an edge detection unit that respectively perform data and edge detection on the half-rate DFE equalized signal; and
    a pattern filter that receives a set of sampling data by the detection units and that detects a data pattern, three consecutive bits of which are 110 or 001, the pattern filter, based on a result of the detection, selecting edge data on the half-rate DFE equalized signal when the data pattern of 110 or 001 is detected,
    wherein the pattern filter includes:
        an exclusive-OR operation unit executing an exclusive-OR operation on a detected string of consecutive data of the half-rate DFE equalized signal; and
        a selector that selects a result of edge detection on the half-rate DFE equalized signal or a result of edge detection on the non-half-rate DFE equalized signal, based on a result of the exclusive-OR operation executed by the exclusive-OR operation unit.

4. The apparatus according to claim 1, further comprising:
    a circuit that cancels offset voltage at least one of the data detection unit and edge detection unit.

5. An apparatus for decision feedback equalization (DFE) comprising:
    an odd data receiving unit that receives an odd data sampling clock, an odd edge sampling clock and a DFE input signal and that includes a half-rate DFE equalization function;
    an even data receiving unit that receives an even data sampling clock, an even edge sampling clock and the DFE input signal and that includes a half-rate DFE equalization function,
    the odd data receiving unit and the even data receiving unit each including a data detection unit and an edge detection unit that respectively perform data and edge detection on the half-rate DFE equalized signal; and
    a pattern filter that receives a set of sampling data by the detection units and that detects a data pattern, three consecutive bits of which are 110 or 001, the pattern filter, based on a result of the detection, selecting edge data on the half-rate DFE equalized signal when the data pattern of 110 or 001 is detected,
    wherein one or each of the odd data receiving unit and the even data receiving unit includes:
        an amplitude error sampling unit arranged in parallel with the data detection unit for data detection on the half-rate DFE equalized signal, the amplitude error sampling unit having an adjustable sampling threshold value.

6. An apparatus for decision feedback equalization (DFE) comprising:
    an odd data receiving unit that receives an input signal;
    an even data receiving unit that receive the input signal; and
    a pattern filter that receives respective sampling data sampled by the odd data receiving unit and the even data receiving unit;

the odd data receiving unit sampling a half-rate DFE equalized signal with an odd data timing clock and sampling both of the half-rate DFE equalized signal and a non-half-rate DFE equalized signal with an odd edge timing clock, the even data receiving unit sampling a half-rate DFE equalized signal with an even data timing clock and sampling both of the half-rate DFE equalized signal and the non-half-rate DFE equalized signal with an even edge timing clock, the pattern filter selecting, as one of the edge decision data sampled at the odd edge timing and at the even edge timing, one of the half-rate DFE equalized signal and the non-half-rate DFE equalized signal, in response to the value of a data pattern of three consecutive bits obtained from data decision data sampled at the odd and even data timings, wherein the odd data receiving unit and the even data receiving unit each include:

a DFE equalized waveform processing unit receiving an input signal; and a non-DFE equalized waveform processing unit, also receiving the input signal, wherein the DFE equalized waveform processing unit includes:

a DFE adder that adds the input signal and a decision feedback signal to output a DFE equalized signal;

a data sampling unit that samples the DFE equalized signal with the odd data timing clock or the even data timing clock; and an edge sampling unit that samples the DFE equalized signal with the odd edge timing clock or the even edge timing clock, data decision data, obtained on sampling by the data sampling unit, being negatively fed back as a decision feedback signal via a set of latches and a set of tap gains for use by the DFE adder for DFE equalization, the data decision data being also output as data decision data to the pattern filter after passage through the set of latches, the edge decision data, sampled by the edge sampling unit, being delay-adjusted by the set of latches and output as odd or even half-rate equalized edge decision data to the pattern filter, and wherein the non-DFE equalized waveform processing unit includes an edge sampling unit that delays the input signal by an amount corresponding to delay caused by the DFE adder of the DFE equalized waveform processing unit and that samples the edge decision data of the non-half-rate DFE equalized signal with a timing clock of the same timing as the sampling timing of the edge sampling unit of the DFE equalized waveform processing unit, and an output of the edge sampling unit being delay-adjusted by a set of latches and supplied to the pattern filter.

7. An apparatus for decision feedback equalization comprising:

an odd data receiving unit that receives an input signal;

an even data receiving unit that receive the input signal; and a pattern filter that receives respective sampling data sampled by the odd data receiving unit and the even data receiving unit;

the odd data receiving unit sampling a half-rate DFE equalized signal with an odd data timing clock and sampling both of the half-rate DFE equalized signal and a non-half-rate DFE equalized signal with an odd edge timing clock, the even data receiving unit sampling a half-rate DFE equalized signal with an even data timing clock and sampling both of the half-rate DFE equalized signal and the non-half-rate DFE equalized signal with an even edge timing clock, the pattern filter selecting, as one of the edge decision data sampled at the odd edge timing and at the even edge timing, one of the half-rate DFE equalized signal and the non-half-rate DFE equalized signal, in response to the value of a data pattern of three consecutive bits obtained from data decision data sampled at the odd and even data timings, wherein a decision feedback signal, obtained on combining together an output of a preset stage tap gain of the set of tap gains of the odd data receiving unit and an output of a preset stage tap gain of the set of tap gains of the even data receiving unit, is negatively fed back to the DFE adder of the DFE equalized waveform processing unit of the odd data receiving unit; and wherein a decision feedback signal, obtained on combining together an output of a preset stage tap gain of the set of tap gains of the even data receiving unit and an output of a preset stage tap gain of the set of tap gains of the odd data receiving unit, is negatively fed back to the DFE adder of the DFE equalized waveform processing unit of the even data receiving unit.

8. The apparatus according to claim 6, wherein the pattern filter selects edge data on the half-rate DFE equalized signal in case the data pattern of three consecutive bits is 110 or 001.

9. The apparatus according to claim 6, wherein the pattern filter detects data patterns of three consecutive bits of 110 or 001 or data patterns of three consecutive bits of 101 or 010; and wherein the pattern filter selects edge data on the half-rate DFE equalized signal on detection of the 110 or 001 data pattern and selects edge data on the non-half-rate DFE equalized signal on detection of the 110 or 001 data pattern.

10. A method for decision feedback equalization comprising:

sampling a half-rate DFE equalized signal with an odd data timing clock to output data decision data, and sampling both the half-rate DFE equalized signal and a non-half-rate DFE equalized signal with an odd edge timing clock to output edge decision data; and sampling a half-rate DFE equalized signal with an even data timing clock to output data decision data, and sampling both the half-rate DFE equalized signal and the non-half-rate DFE equalized signal with an even edge timing clock to output edge decision data; and selecting, as one of the edge decision data sampled at the odd edge timing and at the even edge timing, one of the half-rate DFE equalized signal and the non-half-rate DFE equalized signal, in response to the value of a data pattern of three consecutive bits obtained from the data decision data sampled at the odd and even data timings;

a pattern filter detecting, as the data pattern of the three consecutive bits, a data pattern of 110 or 001 or a data pattern of 010 or 101; and the pattern filter selecting, on detection of the data pattern of 110 or 001, the edge decision data on the half-rate DFE equalized signal and the pattern filter selecting, on detection of the data pattern of 101 or 010, the edge decision data on the non-half-rate DFE equalized signal.

11. The method according to claim 10, comprising the pattern filter selecting edge decision data on the half-rate DFE equalized signal in case the data pattern of three consecutive bits is 110 or 001.

* * * * *